US012781036B2

(12) United States Patent
Nielsen et al.

(10) Patent No.: US 12,781,036 B2
(45) Date of Patent: Nov. 3, 2026

(54) COMPOSITION INCLUDING AN ACRYLIC POLYMER, A WATER-REPELLENT POLYMER, AND AN ULTRAVIOLET LIGHT STABILIZER AND RELATED ARTICLES AND METHODS

(71) Applicant: 3M INNOVATIVE PROPERTIES COMPANY, St. Paul, MN (US)

(72) Inventors: Kent E. Nielsen, London (CA); Arianne E. McCarthy, London (CA); Raul P. Moraes, London (CA); Erika J.J. Remigio, Guelph (CA); Markus A. Wicki, London (CA); Frank A. Brandys, London (CA); David W. Stegink, Mendota Heights, MN (US); Francis J. Tate, Vadnais Heights, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 624 days.

(21) Appl. No.: 18/011,489

(22) PCT Filed: Jun. 24, 2021

(86) PCT No.: PCT/US2021/038821

§ 371 (c)(1),
(2) Date: Dec. 19, 2022

(87) PCT Pub. No.: WO2021/262934

PCT Pub. Date: Dec. 30, 2021

(65) Prior Publication Data

US 2023/0257573 A1 Aug. 17, 2023

Related U.S. Application Data

(60) Provisional application No. 63/188,808, filed on May 14, 2021, provisional application No. 63/043,476, filed on Jun. 24, 2020.

(51) Int. Cl.

| | |
|---|---|
| ***C08L 33/08*** | (2006.01) |
| ***C09D 5/14*** | (2006.01) |
| ***C09D 5/22*** | (2006.01) |
| ***C09D 7/48*** | (2018.01) |
| ***C09D 7/65*** | (2018.01) |
| ***C09D 133/08*** | (2006.01) |

(52) U.S. Cl.

CPC ................ *C08L 33/08* (2013.01); *C09D 5/14* (2013.01); *C09D 5/22* (2013.01); *C09D 7/48* (2018.01); *C09D 7/65* (2018.01); *C09D 133/08* (2013.01); *C08L 2201/50* (2013.01); *C08L 2205/03* (2013.01)

(58) Field of Classification Search

CPC . C08K 3/014; C08L 2201/50; C08L 2205/03; C08L 33/08; C08L 67/08; C08L 75/00; C08L 83/04; C09D 133/00; C09D 133/08; C09D 5/022; C09D 5/14; C09D 5/22; C09D 7/48; C09D 7/65

See application file for complete search history.

(56) References Cited

U.S. PATENT DOCUMENTS

| | | | | |
|---|---|---|---|---|
| 3,679,598 | A | 7/1972 | Alburger | |
| 4,404,239 | A | 9/1983 | Grunewalder | |
| 4,897,291 | A | 1/1990 | Kim | |
| 4,913,972 | A | 4/1990 | Grunewalder et al. | |
| 5,228,905 | A | 7/1993 | Grunewalder et al. | |
| 6,136,408 | A | 10/2000 | Radcliffe et al. | |
| 6,277,912 | B1 * | 8/2001 | Ashihara | C08F 287/00 525/65 |
| 6,383,652 | B1 | 5/2002 | Templeton et al. | |
| 6,608,131 | B1 | 8/2003 | Winterowd et al. | |
| 6,864,489 | B2 | 3/2005 | Chen et al. | |
| 6,962,732 | B2 | 11/2005 | Won et al. | |
| 7,811,374 | B2 | 10/2010 | Osborne et al. | |
| 8,283,405 | B2 | 10/2012 | Yukawa | |
| 8,309,220 | B2 | 11/2012 | Kiljunen et al. | |
| 8,404,312 | B2 | 3/2013 | Nowak et al. | |
| 8,461,253 | B2 | 6/2013 | Ambrose et al. | |
| 8,772,407 | B2 | 7/2014 | Mowrer | |
| 9,228,093 | B2 | 1/2016 | Parker et al. | |

(Continued)

FOREIGN PATENT DOCUMENTS

| | | | | |
|---|---|---|---|---|
| CN | 104710889 A * | 6/2015 | | C09D 5/14 |
| CN | 103881500 B | 2/2017 | | |

(Continued)

OTHER PUBLICATIONS

CN-104710889-A, English translation (Year: 2015).*

(Continued)

*Primary Examiner* — Ana L. Woodward
(74) *Attorney, Agent, or Firm* — Kathleen B. Gross

(57) ABSTRACT

The composition includes an acrylic polymer, a water-repellent polymer, and a stabilizer against ultraviolet light, in which the stabilizer is an ultraviolet light-absorber, a hindered amine light stabilizer, or a combination thereof. A coated article includes at least one of hardwood, softwood, oriented strand board, or plywood with a surface that is at least partially coated, wherein the surface that is at least partially coated has a b* value on the International Commission on Illumination L*, a*, and b* scale greater than 15 after 90 days of weathering. Methods of making the composition and the coated article are also described.

20 Claims, No Drawings

(56) References Cited

U.S. PATENT DOCUMENTS

| | | | |
|---|---|---|---|
| 10,030,171 | B2 | 7/2018 | Agrawal et al. |
| 10,414,945 | B2 | 9/2019 | Winterowd et al. |
| 2003/0189191 | A1 | 10/2003 | Kunimoto et al. |
| 2004/0249052 | A1 | 12/2004 | Kiriya et al. |
| 2007/0116732 | A1 | 5/2007 | Goebel et al. |
| 2007/0264420 | A1 | 11/2007 | Davies et al. |
| 2008/0271842 | A1 | 11/2008 | Schoning |
| 2010/0178494 | A1* | 7/2010 | Foster .................. C09D 133/16 428/424.7 |
| 2012/0145721 | A1 | 6/2012 | Cavallin et al. |
| 2017/0247573 | A1 | 8/2017 | Agrawal et al. |
| 2017/0275483 | A1* | 9/2017 | Deighton ............... C09D 11/03 |
| 2018/0319037 | A1 | 11/2018 | Kalwa et al. |

FOREIGN PATENT DOCUMENTS

| | | | |
|---|---|---|---|
| EP | 3354430 | B1 | 7/2019 |
| JP | 2005-218914 | A | 8/2005 |
| JP | 5255855 | B2 | 8/2013 |
| JP | 2020-015829 | A | 1/2020 |

OTHER PUBLICATIONS

Cogulet, "Wood Degradation Under UV Irradiation: A Lignin Characterization", Journal of Photochemistry & Photobiology, B: Biology, 2016, vol. 158, pp. 184-191.
Hayoz, "A New Innovative Stabilization Method for the Protection of Natural Wood", Progress in Organic Coatings, 2003, vol. 48, pp. 297-309.
International Search Report for PCT International Application No. PCT/US2021/038821, mailed on Oct. 12, 2021, 4 pages.
Kataoka, "Violet Light Causes Photodegradation of Wood Beyond the Zone Affected by Ultraviolet Radiation", Holzforschung, 2007, vol. 61, pp. 23-27.
Parvate, "Advances in Self-Crosslinking of Acrylic Emulsion: What We Know and What We Would Like to Know", Journal of Dispersion Science and Technology, 2019, vol. 40, No. 04, pp. 519-536.
Taylor, "Properties of 'Enhanced' OSB Subfloor Panels", Forest Products Journal, 2008, vol. 58, No. 05, pp. 77-79.
Kobayashi, T., "Understandable, Useful Paint Material for beginners", The Nikkan Kogyo Shimbun, Ltd. (The Daily Industrial News), Aug. 2018.

* cited by examiner

COMPOSITION INCLUDING AN ACRYLIC POLYMER, A WATER-REPELLENT POLYMER, AND AN ULTRAVIOLET LIGHT STABILIZER AND RELATED ARTICLES AND METHODS

CROSS-REFERENCE TO RELATED APPLICATION

This application is a national stage filing under 35 U.S.C. 371 of PCT/US2021/038821, filed Jun. 24, 2021, which claims priority to U.S. Provisional Application Nos. 63/043,476, filed Jun. 24, 2020, and 63/188,808, filed May 14, 2021, the disclosures of which are incorporated by reference in their entirety herein.

BACKGROUND

Articles made from cellulose-containing materials, such as window frames, furniture, cabinets, and flooring, are often treated with one or more compositions to enhance the appearance of the article, and/or provide protection from various environmental conditions that can deteriorate the underlying article. U.S. Pat. Appl. Pub. No. 2007/0116732 (Goebel et al.) reports methods for making treated and/or coated cellulose-containing substrates and methods for reducing the cycle time to make a treated and/or coated cellulose-containing substrate. U.S. Pat. No. 8,404,312 (Nowak et al.) discloses a two-part edge sealing composition for engineered wood products. U.S. Pat. Appl. Pub. No. 2017/0247573 (Agrawal et al.) discloses wax compositions for oriented strand board. U.S. Pat. No. 6,383,652 (Templeton et al.), U.S. Pat. No. 8,461,253 (Ambrose et al.), and 9,228,093 (Parker et al.) describe waterborne compositions said to be useful for coating wood.

SUMMARY

The present disclosure provides compositions useful, for example, for protecting articles made from cellulosic materials from the effects of ultraviolet light and water, particularly the greying of the article and concomitant physical changes in the article. The present disclosure further provides articles that are resistant to such greying and physical changes. In some embodiments, the compositions are also resistant to water-whitening when exposed to or immersed in water.

In one aspect, the present disclosure provides a composition that includes an acrylic polymer, a water-repellent polymer, and a stabilizer against ultraviolet light, in which the stabilizer is an ultraviolet light-absorber, a hindered amine light stabilizer, or a combination thereof.

In another aspect, the present disclosure provides an article that includes a substrate having a surface that is at least partially coated with the composition.

In another aspect, the present disclosure provides a method of making the composition. The method includes combining the acrylic polymer in water, the water-repellant polymer, and the stabilizer to make the composition. In some embodiments, the method includes combining dispersions of the acrylic polymer in water, the water-repellant polymer in water, and the stabilizer in water to make the composition.

In another aspect, the present disclosure provides a method of making the article. The method includes applying the composition described above or made by the method described above to at least a portion of the substrate.

In another aspect, the present disclosure provides a coated article including at least one of hardwood, softwood, oriented strand board, or plywood having a surface that is at least partially coated. The surface that is at least partially coated has a b* value on the International Commission on Illumination L*, a*, and b* scale greater than 15 after 90 days of weathering outdoors at an average maximum daily temperature in a range from 20° C. to 25° C. while the surface that is at least partially coated was exposed to a total precipitation in a range from 250 millimeters to 265 millimeters, average daylight in a range from 12 to 14 hours, and an average UV index in a range from 4.0 to 4.5.

In this application:

Terms such as "a", "an" and "the" are not intended to refer to only a singular entity but include the general class of which a specific example may be used for illustration. The terms "a", "an", and "the" are used interchangeably with the term "at least one".

The phrase "comprises at least one of" followed by a list refers to comprising any one of the items in the list and any combination of two or more items in the list. The phrase "at least one of" followed by a list refers to any one of the items in the list or any combination of two or more items in the list.

The terms "crosslinking" and "crosslinked" refers to joining polymer chains together or being capable of joining polymer chains together by covalent chemical bonds to form a network polymer. A crosslinked polymer is generally characterized by insolubility but may be swellable in the presence of an appropriate solvent. The term "crosslinked" includes partially crosslinked. The term "crosslinking" refers to a polymer that may or may not yet be crosslinked but can undergo crosslinking or further crosslinking.

The term "polymer" refers to a molecule having a structure which includes the multiple repetition of units derived, actually or conceptually, from one or more monomers. The term "monomer" refers to a molecule of low relative molecular mass that can combine with others to form a polymer. The term "polymer" includes homopolymers and copolymers, as well as homopolymers or copolymers that may be formed in a miscible blend, e.g., by coextrusion or by reaction. The term "polymer" includes random, block, graft, and star polymers.

All numerical ranges are inclusive of their endpoints and nonintegral values between the endpoints unless otherwise stated (e.g., 1 to 5 includes 1, 1.5, 2, 2.75, 3, 3.80, 4, 5, etc.).

DETAILED DESCRIPTION

Oriented strand board (OSB) is an engineered board panel that is manufactured, in general terms, by applying multiple, successive layers of resin coated wood strands to a moving web. Each layer of wood strands is delivered to the prior layer in a different orientation, which builds mechanical strength in the final board. The final mat of wood strands is compressed under conditions of high pressure and temperature to produce the desired board thickness.

OSB is used extensively in wood construction; however, the surface aesthetics deteriorate as a function of time and exposure to moisture, sunlight, and elevated temperature. Under these conditions, the color of the board tends to become grey. We have observed that this color change is accompanied by flaking or chipping of the wooden strands. Furthermore, there is a perception within the construction industry that the discoloration signifies a loss of performance. Upon exposure to moisture at elevated temperature, the board may also swell due to penetration of water, making the board more difficult to use. We have observed these problems with other wood and engineered wood products as well.

OSB can be painted after being primed (see www.thespruce.com/osb-looks-hideous-can-you-paint-it-1822689), but the wet-out and adhesion of paints on OSB is challenging due to the smoothness and pressed nature of the wood strands and the high average contact angle of OSB, which we have measured at 136 degrees. These characteristics make it challenging to develop a coating that provides environmental protection of the underlying board, as well as adhesion to the wood.

The present disclosure provides compositions useful, for example, for protecting articles made from OSB and other cellulosic materials from the effects of ultraviolet light and water, particularly the greying of the article and the accompanying physical changes in the article. In some embodiments, the compositions resist whitening after exposure to water.

The composition of the present disclosure includes an acrylic polymer. As used herein, "acrylic", and like terms, is meant to encompass both acrylates and methacrylates. A variety of acrylic polymers may be useful in the composition. In some embodiments, the acrylic polymer is made from hydrophobic acrylic monomers including acrylate and/or methacrylate esters of a linear or branched alcohol having at least 4 carbon atoms (in some embodiments, 4 to 14 carbon atoms, 4 to 10 carbon atoms, 4 to 8 carbon atoms, or 6 to 8 carbon atoms). Examples of such monomers, which are suitable for use in the acrylic polymer, include isooctyl acrylate, 4-methyl-2-pentyl acrylate, 2-methyl-butyl acrylate, isoamyl acrylate, sec-butyl acrylate, n-butyl acrylate, 2-ethylhexyl acrylate, isodecyl methacrylate, isononyl acrylate, isodecyl acrylate, and mixtures thereof. Other suitable monomers for use in preparing the acrylic polymer include at least partially hydrophilic monomers such as acrylic acid, methacrylic acid, fumaric acid, maleic acid, itaconic acid, crotonic acid, oligomeric acrylic acid, 2-hydroxyethyl acrylate, methyl (meth)acrylate, ethyl (meth)acrylate, N-vinyl-2-pyrrolidone, and mixtures thereof. Such hydrophilic monomers are typically used in amounts of up to 2, 1, or 0.5 percent by weight, based on the total weight of monomers used to make the acrylic polymer. If acid functional groups are present in the acrylic polymer, they can be neutralized using, for example, amines (e.g., dimethylethanolamine, ammonia, triethanolamine, dimethylethyl ethanolamine, and N',N'-dimethyl aminopropylamine) or alkali metal salts (e.g., sodium or potassium hydroxide). Other monomers may be usefully incorporated into the acrylic polymer, for example, styrene, vinyl toluene, nitriles (e.g., acrylonitrile and methacrylonitrile), vinyl and vinylidene halides, and vinyl esters (e.g., vinyl acetate).

The weight average molecular weight (Mw) of the acrylic polymer can be in a range from, for example, 10,000 to 1,000,000 grams per mole, 50,000 to 500,000, or 50,000 to 200,000 grams per moles, as determined by gel permeation chromatography using a polystyrene standard.

In some embodiments, the acrylic polymer is at least one of crosslinked or crosslinking. In other words, the acrylic polymer includes functional groups that are capable of crosslinking the polymer chains or, in some cases, have already reacted to form such crosslinks. Several functional groups have been incorporated into acrylic polymers to provide crosslinking at low (e.g., room) temperature: silane groups, N-methylol groups, acetoacetoxy or carboxylic acid with metal chelates, and ketone or aldehyde groups to name a few. Descriptions of such acrylates can be found, for example, in Parvate, S. and Mahanwar, P. "Advances in Self-Crosslinking of Acrylic Emulsion: What We Know and What We Would Like to Know"; *Journal of Dispersion Science and Technology,* 2019, Vol. 40, No. 4, pp. 519-536. In this article, self-crosslinking refers not only to polymer chains that can react with each other but also one-part acrylic systems (typically emulsions) that can undergo crosslinking upon removal of the carrier fluid (e.g., water). In some embodiments, an acrylic polymer that is at least one of crosslinking or crosslinked makes up at least 60%, 70%, 75%, 80%, 90%, or 95% of acrylic polymer in the composition.

N-Methylolacrylamide (NMA) is a monomer useful for incorporating an N-methylol group into an acrylic polymer, for example. The methylol group of one acrylic polymer chain can react with a methylol group of another acrylic polymer chain with cleavage of formaldehyde and water molecule to provide crosslinking.

Unsaturations in silanes, such as vinylsilane and methacryloxysilanes allows incorporation into an acrylic polymer chain. Upon drying of the coating, the pH drops and triggers the hydrolysis of the alkoxysilane into a silanol (Si—OH), which then unites with a second silanol available on the polymer chain and forms a siloxane (Si—O—Si) bond.

Acid-functional acrylic monomers, described above, can be useful for incorporating pendant carboxylic acid groups into the acrylic polymer. Polyvalent metals or metal complexes are useful as crosslinkers for these acid groups. Useful polyvalent metals include zinc (Zn), zirconium (Zr), aluminum (Al), titanium (Ti), chromium (Cr) or a mixture of any two or more metals. Usually, the metal crosslinker is a salt or complex of phosphate, propionate, sulfate, nitrate, acetate, tartrate, ammonia, oxide, carbonate, or acetylacetonate.

Acrylic monomers comprising an aldehyde and/or ketone functional group (e.g., diacetone acrylamide, acrolein, vinyl methyl ketone, acetoacetoxyethyl methacrylate, and allyl acetoacetate) can react with a crosslinking agent having at least two functional groups reactive with the carbonyl functionality of the acrylic copolymer. Any nitrogen-containing compound having at least two amine nitrogens reactive with carbonyl groups may be used as the crosslinking agent. Such crosslinking agents may be aliphatic or aromatic, polymeric or non-polymeric, and may be used singly or in a combination of two or more. Examples of suitable crosslinking agents include adipic acid dihydrazide, diamines (e.g., ethylenediamine, propylenediamine, tetramethylenediamine, pentamethylenediamine, hexamethylenediamine, diethylenetriamine, triethylenetetramine), and tetraaminoethylene. In some embodiments, the crosslinking agent is present in the composition in an amount such that the functional groups (e.g., hydrazide groups) reactive with the carbonyl functionality of the acrylic polymer are in a range of 0.02 to 5 equivalents, 0.1 to 3 equivalents, or 0.5 to 2 equivalents per one equivalent of carbonyl group contained in the acrylic polymer. In some embodiments of a composition of the present disclosure, after the composition is applied to a substrate and as water in the emulsion evaporates, the hydrazide groups and the carbonyl groups crosslink as a result of dehydration condensation to form a cured film.

Some acrylic polymers useful for practicing the present disclosure are commercially available, for example, as emulsions from Alberdingk Boley, Greensboro, N.C., under the trade designations "AC 2403", "AC 3630", and "AC 2514", from Dow, Midland, Mich., under the trade designation "RHOPLEX" in grades "AC-1034", "GL-618", and CS-4000, and from The Lubrizol Corporation, Wickliffe, Ohio, under the trade designation "CARBOSET GA 7487".

In some embodiments, the crosslinking acrylic polymer comprises at least one of silane groups, N-methylol groups, acetoacetoxy groups, carboxylic acid groups, ketones or aldehydes. In some embodiments, the crosslinked acrylic polymer comprises at least one of siloxane bonds, metal-chelated acetoacetoxy or carboxylic acid groups, alpha-amino amide groups, or ketimine or aldimine groups.

In some embodiments, the composition of the present disclosure includes at least 90 percent by weight of the acrylic polymer described above in any of its embodiments, based on the total weight of solids (that is, excluding any water or organic solvents) in the composition.

The composition of the present disclosure includes a water-repellant polymer. Suitable water-repellant polymers include waxes, silicones, polybutadiene polymers, polyethylene, polypropylene, and polytetrafluoroethylene.

Suitable polybutadiene polymers include polychloroprene homopolymers commercially available, for example, from Denka Performance Elastomer (New York, N.Y.).

In some embodiments, the water-repellant polymer is a wax. Waxes are typically solid at 20° C., with a melting point greater than 40° C. without decomposing and have a relatively low viscosity just above the melting point. The source of the wax can be, for example, plant (e.g., carnauba, candelilla, tallow, soy, and palm), animal (e.g., beeswax, lanolin, and lanocerin), mineral (e.g., montan, paraffin, and microcrytalline), or synthetic (e.g., polyethylene, fatty acid amines and polyamides). In some embodiments, the wax is a paraffin wax. Paraffins are a mixture of hydrocarbons containing from about 18 to about 60 carbon atoms per molecule and can be straight-chain (i.e., normal or n-paraffins) or branched (i.e., isoparaffins). Lower molecular weight paraffins have a lower boiling point, while higher molecular weight paraffins have a higher boiling point. Therefore, separation of paraffins by the carbon number is possible. In some embodiments, the wax is a polyethylene wax. Polyethylene waxes are typically low-molecular-weight polyethylenes although they generally have higher molecular weights than paraffin waxes.

Waxes may be conveniently formulated into dispersions (e.g., emulsions). Molten wax can be dispersed in water in the presence of a surfactant, for example. Paraffin and polyethylene waxes are commercially available as emulsions, for example, from BYK (Wesel, Germany) under the trade designation "AQUACER" and from ExxonMobil (Irving, Tex.) under the trade designation "PROWAX". Amide waxes are commercially available, for example, from Clariant (Muttenz, Switzerland) under the trade designation "CERIDUST".

In some embodiments, the water-repellant polymer is a silicone. Silicone oils and waxes may be useful. Useful silicones are typically polydimethylsiloxanes which may or may not include reactive functional groups pendent from the backbone or at terminal positions. Useful functional groups comprising at least one of vinyl, mercapto, amino, carboxy, hydroxyl, or hydride functional groups. In some embodiments, the silicone is a mixture of polydimethylsiloxane that is unsubstituted by reactive functional groups and a polyorganosiloxane that includes reactive functional groups. Such reactive functional groups are useful for dispersing the silicones into water. Silicones are commercially available as emulsions in water, for example, from Wacker (Adrian, Mich.) under the trade designation "SILRES" and from Silcona GmbH & Co. KG under the trade designation "SILCO PHOBE".

The water-repellant polymer can be present in any useful amount. In some embodiments, the water-repellant polymer is present in an amount of up to 6, 5, 4, or 3 percent by weight, based on the total weight of solids (that is, excluding any water or organic solvents) in the composition. In some embodiments, the water-repellant polymer is present in an amount of at least 0.005 or 0.01 percent by weight, based on the total weight of solids in the composition. In some embodiments, the water-repellant polymer is present in a range from one percent to five percent by weight or 1.5 percent to 2.5 percent by weight, based on the total weight of solids in the composition.

The composition of the present disclosure includes a stabilizer against UV light. The stabilizer may be a UV absorber (UVA), a hindered amine light stabilizer (HALS), or a combination thereof. A UVA is typically a compound capable of absorbing or blocking electromagnetic radiation at wavelengths less than 400 nanometers (nm) while remaining substantially transparent at wavelengths greater than 400 nm. UVAs are known to those skilled in the art as being capable of dissipating absorbed light energy from UV rays as heat by reversible intramolecular proton transfer. Such compounds can intervene in the physical and chemical processes of photoinduced degradation. UVAs are typically included in the coating compositions disclosed herein in an amount sufficient to absorb at least 70% (in some embodiments, at least 80%, or greater than 90% of the UV light in the wavelength region from 180 nm to 400 nm). Typically, it is desirable if the UVA is highly soluble in polymers, highly absorptive, photo-permanent and thermally stable in the temperature range from 200° C. to 300° C. In some embodiments, the stabilizer in the coating composition disclosed herein is a red-shifted UVA (RUVA). RUVAs typically have enhanced spectral coverage in the long-wave UV region, enabling it to block the high wavelength UV light that can cause yellowing in polymers. HALS are typically compounds that can scavenge free-radicals, which can result from photodegradation.

Any class of UVA may be useful. Examples of useful classes include benzophenones, benzotriazoles, triazines, cinnamates, cyanoacrylates, dicyano ethylenes, salicylates, oxanilides, and para-aminobenzoates. In some of these embodiments, the pendent ultraviolet absorbing group comprises a triazine, a benzophenone, or a benzotriazole. Suitable UVAs include triazines (e.g., hydrophenyl-substituted triazines such as 2-(4,6-diphenyl-1-3,5-triazin-2-yl)-5-Rhexyl)oxylphenol and 2-hydroxyphenyl-s-triazine), hydroxybenzophenones, and benzotriazoles (e.g., 5-trifluoromethyl-2-(2-hydroxy-3-alpha-cumyl-5-tert-octylphenyl)-2H-benzotriazole, 2-(2-hydroxy-3,5-di-alpha-cumylphenyl)-2H-benzotriazole, 5-chloro-2-(2-hydroxy-3-tert-butyl-5-methylphenyl)-2H-benzotiazole, 5-chloro-2-(2-hydroxy-3,5-di-tert-butylphenyl)-2H-benzotriazole, 2-(2-hydroxy-3,5-di-tert-amylphenyl)-2H-benzotriazole, 2-(2-hydroxy-3-alpha-cumyl-5-tert-octylphenyl)-2H-benzotriazole, and 2-(3-tert-butyl-2-hydroxy-5-methylphenyl)-5-chloro-2H-benzotriazole). Suitable HALS include decanedioic acid, bis(2,2,6,6-tetramethyl-1-(octyloxy)-4-piperidinyl)ester. Suitable UVAs and HALS include those available, for example, from BASF, Florham Park, N.J., under the trade designations "TINUVIN" and "CHIMASSORB". Some commercially available UVAs and HALS are advantageously provided as aqueous dispersions, for example, from BASF under the trade designations "TINUVIN 5333-DW" and "TINUVIN 123-DW".

The UVA can also be copolymerized with the monomers useful to make the acrylic polymer, the alkyd polymer, or other polymer in the composition of the present disclosure. Examples of suitable polymerizable UVAs include 2-(cyano-β,β-biphenylacryloyloxy)ethyl-1-methacrylate, 2-(α-cyano-β,β-biphenylacryloyloxy)ethyl-2-methacrylamide, N-(4-methacryloylphenol)-N'-(2-ethylphenyl)oxamide, vinyl 4-ethyl-α-cyano-β-phenylcinnamate, 2-hydroxy-4-(2-hydroxy-3-methacryloyloxypropoxy)benzophenone, 2-hydroxy-4-methacryloyloxybenzophenone, 2-hydroxy-4-(2-acryloyloxyethoxy)benzophenone, 2-hydroxy-4-(4-acryloyloxybutoxy)benzophenone, 2,2'-dihydroxy-4-(2-acryloyloxyethoxy)benzophenone, 2-hydroxy-4-(2-acryloyloxyethoxy)-4'-(2-hydroxyethoxy)benzophenone, 4-(allyloxy)-2-hydroxybenzophenone, 2-(2'-hydroxy-3'-methacrylamidomethyl-5'-octylphenyl)benzotriazole, 2-(2-hydroxy-5-vinylphenyl)-2-benzotriazole, 2-(2H-benzotriazol-2-yl)-4-methyl-6-(2-propenyl)phenol, 2-(2'-hydroxy-5'-methacryloyloxyethylphenyl)-2H-benzotriazole, 2-(2'-hydroxy-5'-methacryloyloxyethylphenyl)-5-chloro-2H-benzotriazole, 2-(2'-hydroxy-5'-methacryloyloxypropylphenyl)-2H-benzotriazole, 2-(2'-hydroxy-5'-methacryloyloxypropylphenyl)-5-chloro-2H-benzotriazole, 2-(2'-hydroxy-3'-tert-butyl-5'-methacryloyloxyethylphenyl)-2H-benzotriazole, 2-(2'-hydroxy-3'-tert-butyl-5'-methacryloyloxyethylphenyl)-5-chloro-2H-benzotriazole, 2,4-diphenyl-6-[2-hydroxy-4-(2-acryloyloxyethoxy)]-1,3,5-triazine, 2,4-bis(2-methylphenyl)-6-[2-hydroxy-4-(2-acryloyloxyethoxy)]-1,3,5-triazine, 2,4-bis(2-methoxyphenyl)-6-[2-hydroxy-4-(2-acryloyloxyethoxy)]-1,3,5-triazine, 2,4-bis(2-ethylphenyl)-6-[2-hydroxy-4-(2-acryloyloxyethoxy)]-1,3,5-triazine, 2,4-bis(2-ethoxyphenyl)-6-[2-hydroxy-4-(2-acryloyloxyethoxy)]-1,3,5-triazine, 2,4-diphenyl-6-[2-hydroxy-4-(2-methacryloyloxyethoxy)]-1,3,5-triazine, 2,4-bis(2-methylphenyl)-6-[2-hydroxy-4-(2-methacryloyloxyethoxy)]-1,3,5-triazine, 2,4-bis(2-methoxyphenyl)-6-[2-hydroxy-4-(2-methacryloyloxyethoxy)]-1,3,5-triazine, 2,4-bis(2-ethylphenyl)-6-[2-hydroxy-4-(2-methacryloyloxyethoxy)]-1,3,5-triazine, 2,4-bis(2-ethoxyphenyl)-6-[2-hydroxy-4-(2-methacryloyloxyethoxy)]-1,3,5-triazine, 2,4-bis(2,4-dimethoxyphenyl)-6-[2-hydroxy-4-(2-acryloyloxyethoxy)]-1,3,5-triazine, 2,4-bis(2,4-dimethylphenyl)-6-[2-hydroxy-4-(2-acryloyloxyethoxy)]-1,3,5-triazine, 2,4-bis(2,4-diethoxyphenyl)-6-[2-hydroxy-4-(2-acryloyloxyethoxy)]-1,3,5-triazine, 2,4-bis(2,4-diethylphenyl)-6[2-hydroxy-4-(2-acryloyloxyethoxy)]-1,3,5-triazine, methacrylates of the foregoing acrylates and acrylates of the foregoing methacrylates.

The stabilizer against UV light can be present in any useful amount. In some embodiments, the stabilizer is present in an amount of up to 6, 5, 4, or 3 percent by weight, based on the total weight of the solids (that is, excluding any water or organic solvents) in the composition. In some embodiments, the stabilizer is present in an amount of at least 0.005 or 0.1 percent by weight, based on the total weight of solids in the composition. In some embodiments, the stabilizer is present in a range from 0.5 percent to five percent by weight or one percent to two percent by weight, based on the total weight of solids in the composition.

In some embodiments, the composition of the present disclosure also includes an alkyd polymer. Alkyd polymers are typically defined as condensation-derived polyesters, based on the combination of polybasic acids, alcohols, and unsaturated oils or fatty acids. In some embodiments, alkyd polymers are polyesters of polyhydroxyl alcohols and polycarboxyl acids reacted with various drying, semi-drying, and non-drying oils in different proportions. Alkyd polymers can be made, for example, from polycarboxylic acids such as phthalic acid, maleic acid, fumaric acid, isophthalic acid, succinic acid, adipic acid, azelaic acid, sebacic acid as well as from anhydrides of such acids, where they exist. Useful polyhydric alcohols that can be reacted with the polycarboxylic acid include glycerol, trimethylolethane, trimethylolpropane, pentaerythritol, sorbitol, mannitol, ethylene glycol, diethylene glycol, and 2,3-butylene glycol. Suitable oils include coconut oil, fish oil, linseed oil, tung oil, castor oil, cottonseed oil, safflower oil, soybean oil, and tall oil. The oils are coupled into the resin molecule by esterification during the manufacturing and become covalently bonded in the polymer. Fully saturated oils tend to give a plasticizing effect to the alkyd, whereas unsaturated oils tend to crosslink and dry rapidly with oxidation to give more tough and durable alkyd resins. Various proportions of the polycarboxylic acid, polyhydric alcohol, and oil are used to obtain alkyd resins of various properties. Commercial glycerol alkyds can be prepared by reaction of fatty oils with glycerol resulting in transesterification and a mixture of fatty acid mono- and diglycerides. These mono- and diglycerides react with dibasic acids or acid anhydrides forming a polyester resin to which pendant fatty acid groups are attached. Alkyd resins are described, for example, in *Polymer Science: A Comprehensive Reference*, Vol. 10 "Polymers for a Sustainable Environment and Green Energy" by T. W. Abraham, R. Höfer, 2012, pp. 27-28.

Water-based alkyd polymers are commercially available, for example, from Reichhold Inc., under the trade designation "BECKOSOL AQ"; from Perstorp AB, under the trade designation "VOXTAR"; and from Arkema, under the trade designation "SYNAQUA".

In some embodiments, the acrylic polymer as described above in any of its embodiments is present in an amount of at least 50 percent by weight, and the alkyd polymer is present in an amount of at least 5 percent by weight, based the total weight of the acrylic polymer and the alkyd polymer. The acrylic polymer may be present in an amount in a range from 50 percent to 95 percent by weight, from 60 percent to 90 percent by weight, from 75 percent to 95 percent by weight, or from 80 percent to 95 percent by weight, based on the total weight of the acrylic polymer and the alkyd polymer. The alkyd polymer may be present in an amount in a range from 5 percent to 50 percent by weight, from 10 percent to 40 percent by weight, from 5 percent to 25 percent by weight, from 5 percent to 20 percent by weight, from 5 percent to 15 percent by weight, from 10 percent to 15 percent by weight, up to 20 percent by weight or up to 15 percent by weight, based on the total weight of the acrylic polymer and the alkyd polymer. The presence of the alkyd polymer is typically beneficial for the adhesion of the composition to a substrate as shown in a comparison of Comparative Example 9 and Comparative Example 3 in Table 5 in the Examples, below.

In some embodiments, the composition of the present disclosure includes a polyurethane. Polyurethanes typically include on average at least about two, ten, or twenty urethane linkages per molecule. While the number of urethane linkages present in the polyurethane polymer is not particularly restricted on the high end, in some embodiments, the polyurethane polymer includes on average less than 1,000, 200, or 50 urethane linkages per molecule of the polyurethane polymer. The polyurethane may include a backbone of any suitable structural configuration. The backbone may optionally include one or more other backbone linkages (e.g., amide, ester, carbonate ester, epoxy, ether, imide, imine, or urea linkages, or a combination thereof). More-over, the backbone of the polyurethane polymer may optionally include one or more oligomer or polymer segments (e.g., acrylic, polyamide, polyester, poly(carbonate ester), epoxy, polyether, polyimide, polyimine, or polyurea segments, or a combination thereof). The polyurethane may be linear, substantially linear, or branched.

Polyurethanes may be formed using any suitable reactants and any suitable process. Polyurethanes are typically formed from starting materials that include one or more isocyanates, one or more polyols, and optionally one or more additional reactants (e.g., having one or more active hydrogen groups). In some cases, a stoichiometric excess of isocyanate is reacted with the polyol. For example, a ratio of isocyanate groups to hydroxyl groups can range from about 1.1:1 to 3:1 (NCO:OH), from about 1.2:1 to 2.5:1, or from about 1.3:1 to 2:1. The polyurethane may have any suitable molecular weight, for example, a number average molecular weight from about 1,000 to about 10,000 or from about 2,500 to about 7,500.

Suitable isocyanates include those having one, two, three, or four isocyanate groups and mixtures thereof. Suitable diisocyanates include isophoronediisocyanate (i.e., 5-isocyanato-1-isocyanatomethyl-1,3,3-trimethylcyclohexane); 5-isocyanato-1-(2-isocyanatoeth-1-yl)-1,3,3-trimethylcyclohexane; 5-isocyanato-1-(3-isocyanatoprop-1-yl)-1,3,3-trimethylcyclohexane; 5-isocyanato-(4-isocyanatobut-1-yl)-1,3,3-trimethylcyclohexane; 1-isocyanato-2-(3-isocyanatoprop-1-yl)cyclohexane; 1-isocyanato-2-(3-isocyanatoeth-1-yl)cyclohexane; 1-isocyanato-2-(4-isocyanatobut-1-yl)cyclohexane; 1,2-diisocyanatocyclobutane; 1,3-diisocyanatocyclobutane; 1,2-diisocyanatocyclopentane; 1,3-diisocyanatocyclopentane; 1,2-diisocyanatocyclohexane; 1,3-diisocyanatocyclohexane; 1,4-diisocyanatocyclohexane; dicyclohexylmethane 2,4'-diisocyanate;trimethylene diisocyanate; tetramethylene diisocyanate; pentamethylenediisocyanate; hexamethylene diisocyanate; ethylethylene diisocyanate;trimethylhexane diisocyanate; heptamethylene diisocyanate; 2-heptyl-3,4-bis(9-isocyanatononyl)-1-pentyl-cyclohexane; 1,2-, 1,4-, and 1,3-bis(isocyanatomethyl)cyclohexane; 1,2-, 1,4-, and 1,3-bis(2-isocyanatoeth-1-yl)cyclohexane; 1,3-bis(3-isocyanatoprop-1-yl)cyclohexane; 1,2-, 1,4- or 1,3-bis(4-isocyanatobuty-1-yl)cyclohexane; liquid bis(4-isocyanatocyclohexyl)-methane; and derivatives or mixtures thereof. In some embodiments, the isocyanate or mixture of isocyanates is non-aromatic (e.g., aliphatic). In some embodiments, the isocyanate comprises at least one of isophorone diisocyanate (IPDI) or hexamethylene diisocyanate (HMDI).

Suitable polyols for preparing polyurethanes include monomers, oligomers, polymers, and mixtures thereof and include diols, triols, polyols having 4 or more hydroxyl groups, and mixtures thereof. Examples of polyols for use as reactants or as starting materials for oligomer or polymer polyols include ethylene glycol, propylene glycol, 1,3-propanediol, glycerol, diethylene glycol, dipropylene glycol, triethylene glycol, trimethylolpropane, trimethylolethane, tripropyleneglycol, neopentyl glycol, pentaerythritol, 1,4-butanediol, hexyleneglycol, cyclohexanedimethanol, a polyethylene or polypropylene glycol, isopropylidene bis(p-phenylene-oxypropanol-2), and mixtures thereof. Examples of suitable oligomer and/or polymer polyols include polyether polyols, polyester polyols, polyether-ester polyols, polyureapolyols, polyamide polyols, polycarbonate polyols, saturated or unsaturated polyolefin polyols, and combinations thereof.

In some embodiments, the polyurethane is formed through a prepolymer intermediate having at least one isocyanate group, in some embodiments, having at least two terminal isocyanate groups. Such isocyanate-terminated prepolymers may be produced, for example, by reacting a material having at least two active hydrogen groups per molecule with an isocyanate compound, such as a diisocyanate. Suitable "active hydrogen groups" include groups having a hydrogen attached to oxygen (O), sulfur (S), and/or nitrogen (N) atoms (e.g., —OH, —COOH, —SH, and —$NH_2$). The material may be an oligomeric or polymeric material such as an acrylic, alkyd, polyester, polyether, polyamide, or a mixture thereof.

In some embodiments, the polyurethane is a water-dispersible urethane resin. In some embodiments, the polyurethane includes a sufficient number of salt groups or salt-forming groups to provide a stable aqueous dispersion when it is combined with an aqueous carrier. In some embodiments, a monomer or oligomer having salt groups or salt-forming groups may be included in the reactants used to produce the polyurethane. In some embodiments, an acid- or anhydride-functional, salt-forming monomer such as dimethylolpropionic acid or trimellitic anhydride is used to form the polyurethane. Alternatively, a prepolymer may be reacted with a compound including a salt group or salt-forming group. In some embodiments, the polyurethane includes acid or anhydride groups (or other neutralizable groups capable of forming anionic salt groups) that are neutralized with a tertiary amine.

Some polyurethanes useful for practicing the present disclosure are commercially available, for example, as emulsions from Alberdingk Boley, under the trade designations "U 4101", "U 4000", "U 915", and "U 933".

In some embodiments, the polyurethane polymer is present in an amount of at least 5 percent by weight, based on the total weight of the acrylic polymer, the polyurethane, and the alkyd polymer. The polyurethane may be present in an amount in a range from 5 percent to 25 percent by weight, from 10 percent to 25 percent by weight, or from 5 percent to 20 percent by weight, based on the total weight of the acrylic polymer, the polyurethane and the alkyd polymer. The presence of the polyurethane may be beneficial for the adhesion of the composition to a substrate as shown in a comparison of Comparative Example 9 and Comparative Example 3 in Table 5 in the Examples, below. In some embodiments, the composition of the present disclosure is essentially free of a polyurethane. In this context, "essentially free of" means that the composition is free of polyurethane or includes not more than 2%, 1%, 0.5%, 0.1%, 0.05%, or 0.01% by weight of a polyurethane, based on the total weight of the composition.

The composition of the present disclosure may include other additives. In some embodiments, the composition includes at least one of an adhesion promoter, a defoamer, a wetting agent, a coalescing agent, a deaerator, a filler, a biocide, an antioxidant, or a photoluminescent compound. Suitable adhesion promoters include functional silanes (e.g., amino silanes) such as those available from Evonik under the trade designation "DYNASYLAN". Suitable fillers include silica and glass bubbles. Suitable silica filler is commercially available, for example, as an aqueous dispersion, from Covestro (Pittsburgh, Pa.) under the trade designation "DISPERCOLL S 5005". Fillers such as silica may be useful, for example, for blocking or scattering UV light. Any suitable amount of filler may be present in the composition. In some embodiments, the composition includes up to 10, 8, or 5 percent by weight filler (including silica), based on the total weight of solids (that is, excluding any water or organic solvents) in the composition. In some embodiments, the composition includes at least 1, 3, or 5 percent by weight filler (including silica), based on the total weight of solids in the composition.

Examples of suitable biocides include mildewcides, fungicides, pesticides, and algicides. Examples of such materials include organic tin compounds (e.g., triphenyl and tributyl tin oxide); chlorinated compounds (e.g., tri-, tetra-, and pentachlorophenol, mono- and dichloro naphthalenes); organic mercury compounds, (e.g., such as phenyl mercury acetate and oleate); 3-iodo-2-propynyl butyl carbonate; a blend of 10 percent by weight of methylene bis(thiocyanate) and 10 percent by weight 2-(thiocyanomethylthio) benzothiazole in 80 percent by weight solvent available under the trade designation "BUSAN 1025" available from Buckman Laboratories, Inc.; metal naphthenates (e.g., zinc and copper naphthenates); propiconazole; tebuconazole; imidacloprid; and zinc borate. Further suitable biocides include those obtained from Thor Specialties, Inc., Shelton, Conn., under the trade designation "ACTICIDE". The biocide can be included in the composition of the present disclosure in any useful amount. In some embodiments, the biocide is present in the composition at a level of from 0.001 to 1, or 0.01 to one percent by weight, based on the total weight of solids in the composition.

In some embodiments, the composition of the present disclosure includes a photoluminescent compound. Useful photoluminescent compounds include those that fluoresce upon exposure to UV or blue light. Examples of useful photoluminescent compounds for the compositions of the present disclosure include Rhodamines (e.g., [9-(2-carboxyphenyl)-6-diethylamino-3-xanthenylidene]-diethylammonium chloride (Rhodamine B), 9-[2-(ethoxycarbonyl)phenyl]-3,6-bis(ethylamino)-2,7-dimethylxanthylium chloride (1:1) (Rhodamine G), and 6-amino-9-(2-methoxycarbonylphenyl)xanthen-3-ylidene]azanium chloride (Rhodamine 123)) and 3',6'-dihydroxyspiro[isobenzofuran-1(3H),9'-[9H]xanthen]-3-one (Fluorescein).

The photoluminescent compound can be included in the composition of the present disclosure in any useful amount. In some embodiments, the photoluminescent compound is included in the composition in an amount up to 5, 4, 3, 2, 1.5, 1, or 0.5 percent by weight, based on the total weight of solids (that is, excluding any water or organic solvents) in the composition. In some embodiments, the photoluminescent compound is included in the composition in an amount of at least 0.05, 0.1, or 0.25 percent by weight, based on the total weight of solids in the composition. The photoluminescent compound can be useful for inspecting whether the composition has been uniformly applied to the substrate or remains intact on the substrate, as described in further detail below. In selecting a photoluminescent compound, it can be advantageous to select a compound that does not significantly photobleach under the conditions of inspection.

The present disclosure includes a method of making the composition of the present disclosure as described above in any of its embodiments. The method includes combining the acrylic polymer, the water-repellant polymer, and the stabilizer to make the composition. In some embodiments, the method further includes combining an alkyd polymer with at least one of the acrylic polymer, the water-repellant polymer, and the stabilizer to make the composition. In some embodiments, the method further includes combining a polyurethane with at least one of the acrylic polymer, the optional alkyd polymer, the water-repellant polymer, and the stabilizer to make the composition. The components can generally be combined in any order and can be mixed by conventional methods.

As described above in various embodiments, the composition of the present disclosure may further comprise water. In some embodiments, the carrier fluid for the composition primarily comprises water; therefore, the compositions may be considered "waterborne". For example, in some embodiments, the carrier fluid is at least 80, 90, or 95 weight percent water, based on the total weight of the carrier fluid.

In some embodiments, the composition of the present disclosure comprises or is derived from a waterborne composition comprising a crosslinking acrylic dispersion (e.g., emulsion), the water-repellant polymer, the stabilizer, and optionally the alkyd polymer, the polyurethane, and/or the biocide. The crosslinking acrylic dispersion (e.g., emulsion) can be any of those described above in any of their embodiments. In some embodiments, the crosslinking acrylic dispersion (e.g., emulsion) includes a crosslinking agent such as nitrogen-containing compound having at least two amine nitrogens reactive with carbonyl groups or metal salt as described above in any of their embodiments. We have found that the presence of the water-repellant polymer, the stabilizer, and optionally the alkyd polymer, the polyurethane, and/or the biocide are generally not detrimental to the ability of the crosslinking acrylic dispersion (e.g., emulsion) to undergo crosslinking upon removal of water to form the crosslinked acrylic polymer.

In some embodiments, the acrylic polymer, water-repellent polymer, stabilizer against ultraviolet light, and optionally the alkyd polymer and/or the polyurethane are in the form of particles that are in the dispersed phase of a dispersion in which water is the primary component, in some cases the exclusive component, of the continuous phase. In some embodiments, the polymer particles have a mean particle size of no more than 5 microns, in some embodiments, no more than one micron, 500 nanometers, 400 nanometers, 300 nanometers, or no more than 200 nanometers. In some embodiments, the polymer particles have a mean particle size of at least 1 nanometer, 5 nanometers, 10 nanometers, 50 nanometers, or at least 100 nanometers. The particle size can be measured by photon correlation spectroscopy as described in International Standard ISO 13321.

When the composition of the present disclosure is waterborne, the composition may also contain one or more cosolvents (e.g., coalescing solvents) although it is not required. Examples of useful coalescing solvents include ethers of polyhydric alcohols (e.g., ethylene glycol monomethyl (or monoethyl) ether, diethylene glycol methyl (or ethyl) ether, triethylene glycol monomethyl (or monoethyl) ether, 2-butoxyethanol (i.e., butyl cellusolve), or di(propylene glycol) methyl ether (DPM)); alkylene glycols and polyalkylene glycols (e.g., ethylene glycol, propylene glycol, butylene glycol, triethylene glycol, hexylene glycol, diethylene glycol, polyethylene glycol, polypropylene glycol); and 2,2,4-trimethyl-1,3-pentanediol monoisobutyrate (an ester alcohol available from Eastman Chemical Company, Kingsport, Tenn., under the trade designation "TEXANOL"). The composition can contain up to 5, 4, 3, 2, or 1 percent by weight of the coalescing solvent, based on the total weight of the composition.

In some embodiments, the acrylic polymer, water-repellent polymer, stabilizer against ultraviolet light, and optionally the alkyd polymer and/or the polyurethane are provided as emulsions that are stabilized, for example, by a surfactant. The surfactant may be present at least at 0.001 percent by weight, 0.005 percent by weight, 0.01 percent by weight, or at least 0.05 percent by weight, based on the total weight of the emulsion. The surfactant may be present at up to 10 percent by weight, 7.5 percent by weight, 5 percent by weight, or up to 3 percent by weight based on the total weight of the emulsion. When two or more emulsions are combined to make the composition of the present disclosure, the composition may include more than one surfactant wherein the combined amount of surfactant can be any of these amounts, based on the total weight of the composition.

The surfactant may be an anionic, cationic, or nonionic surfactant or dispersing agent, or a compatible mixture thereof, such as a mixture of an anionic and a nonionic surfactant. Suitable cationic surfactants include lauryl pyridinium chloride, cetyldimethyl amine acetate, and alkyldimethylbenzylammonium chloride, in which the alkyl group has from 8 to 18 carbon atoms. Suitable anionic surfactants include alkali fatty alcohol sulfates, such as sodium lauryl sulfate; arylalkyl sulfonates, such as potassium isopropylbenzene sulfonate; alkali alkyl sulfosuccinates, such as sodium octyl sulfosuccinate; and alkali arylalkylpolyethoxyethanol sulfates or sulfonates, such as sodium octylphenoxypolyethoxyethyl sulfate, having 1 to 5 oxyethylene units. Surfactants having reactive functional groups may also be useful.

In some embodiments, the composition of the present disclosure is a "low VOC coating composition". As used herein, the term "low VOC composition" means that the composition contains up to 5, 4, 3, 2, or 1 percent by weight VOC (volatile organic compound), based on the total weight of the composition. As used herein, the term "VOC" refers to compounds that have at least one carbon atom and that participate in atmospheric photochemical reactions. Typically, a volatile organic compound has at least one of a vapor-pressure of greater than 0.1 mm Hg at 20° C. or a boiling point of less than 216° C. Examples of "VOCs" include alcohols, benzenes, toluene, chloroform, and cyclohexanes.

In some embodiments, the method of making the composition of the present disclosure as described above in any of its embodiments includes combining dispersions of the acrylic polymer in water, the water-repellant polymer in water, and the stabilizer in water to make the composition. In some embodiments, the method further comprises combining a dispersion of an alkyd polymer in water with at least one of the dispersions of the acrylic polymer in water, the water-repellant polymer in water, and the stabilizer in water to make the composition. In some embodiments, the method further comprises combining a dispersion of a polyurethane in water with at least one of the dispersions of the acrylic polymer in water, the optional alkyd polymer in water, the water-repellant polymer in water, and the stabilizer in water to make the composition. If any of these dispersions includes the polymer in liquid form dispersed in water, the dispersion can be considered an emulsion. The components can generally be combined in any order and can be mixed by conventional methods.

The present disclosure provides an article comprising a substrate having a surface that is at least partially coated with the composition of the present disclosure. Suitable substrates include cellulosic materials, for example, hardwood, softwood, oriented strand board, plywood, paperboard, cardboard, pressed fiber boards, wood veneer, deck boards, fence boards, particleboard, chipboard, and fiberboard. Examples further include medium-density fiberboard, high-density fiberboard, and high moisture resistance board. The substrates, including hardwood and softwood substrates, may be treated or untreated. Such materials may be made entirely of wood, such as pine, oak, maple, mahogany, and cherry. In some cases, however, the materials may comprise wood in combination with another material, such as a resinous material, i.e., wood/resin composites, such as phenolic composites, composites of wood fibers and thermoplastic polymers, and wood composites reinforced with cement, fibers, or plastic cladding. In another example, the substrate can be a particle board comprising wood and wood byproduct particles and a binding resin. In some embodiments, the substrate comprises at least one of treated or untreated hardwood (e.g., oak, mahogany, maple, and cherry), softwood (e.g., pine and cedar), oriented strand board, particleboard, fiberboard, or plywood. In some embodiments, the substrate comprises at least one of treated or untreated hardwood (e.g., oak, mahogany, maple, and cherry), softwood (e.g., pine and cedar), oriented strand board, or plywood.

The present disclosure provides a method of making such an article. The method includes applying the composition to at least a portion of the surface of the substrate. The compositions may be applied to a surface either directly using a variety of techniques (e.g., dipping, spraying, brushing, roll coating, bar coating, or curtain coating), or the composition may be first applied to a spreading device (e.g., a cloth or brush) and then applied to a surface. The method can further include combining the acrylic polymer, the water-repellant polymer, and the stabilizer to make the composition. In some embodiments, the method can include combining at least one of an alkyd polymer or a polyurethane with at least one of the acrylic polymer, the water-repellant polymer, and the stabilizer to make the composition. In some embodiments, the method includes combining dispersions of the acrylic polymer in water, the water-repellant polymer in water, and the stabilizer in water to make the composition. In some embodiments, the method further comprises combining a dispersion of at least one of an alkyd polymer or a polyurethane in water with at least one of the dispersions of the acrylic polymer in water, the water-repellant polymer in water, and the stabilizer in water to make the composition. The components can generally be combined in any order and can be mixed by conventional methods. If any of these dispersions includes the polymer in liquid form dispersed in water, the dispersion can be considered an emulsion.

In some embodiments, the method of making the article further comprises heating the substrate before applying the composition to at least a portion of the surface of the substrate. Heating can be carried out for any time sufficient for the surface of the substrate to reach a temperature of at least 75° C., 80° C., or at least 90° C. The substrate can be heated as part of the manufacturing process, for example, upon applying heat and pressure to make OSB as described above. In other embodiments, the substrate can be heated after manufacturing and storage for some period of time. In these embodiments, the substrate may be heated in an oven set at a temperature of at least 75° C., 80° C., or at least 90° C. and up to 150° C., 125° C., or 100° C. for at least 30, 60, or 90 minutes. Heating may also be carried out, for example, with a heat gun or infrared lamps.

In some embodiments, the method of making the article further comprises heating the substrate after applying the coating composition to at least a portion of the surface of the substrate. Heating may be carried out, for example, with an oven, a heat gun, or infrared lamps. Again, heating can be carried out for any time sufficient for the surface of the substrate to reach a temperature of at least 75° C., 80° C., or at least 90° C., for example, at least 10, 15, 30, 60, or 90 minutes. In some embodiments, the coated substrate is heated in an oven set at a temperature of at least 75° C., 80° C., or at least 90° C. and up to 150° C., 125° C., or 100° C. for at least 10, 15, 30, 60, or 90 minutes.

In some embodiments, the method of making the article of the present disclosure further comprises removing the water from the composition. Heating can be useful for removing water from the composition. We have found that when the composition is in the form of a dispersion in water, and when the substrate is heated as described above in any of its embodiments, water can be removed within 20, 10, or 5 seconds.

As shown in the Examples below, the composition of the present disclosure can provide contact angles when coated on a substrate of at least 90 degrees, 95 degrees, 100 degrees, 105 degrees, or at least 110 degrees. A higher contact angle is an indication of increased resistance to water wetting out and soaking into the substrate. Further as shown in Table 5 of the Examples, below, the composition of the present disclosure has better adhesion to the substrate than comparative examples.

Further as shown in Table 7 in the examples below, the coated substrate has a b* value on the International Commission on Illumination L*, a*, and b* scale greater than 15 after 90 days of weathering outdoors. The b* value of 15 is an indication of when a sample started to look grey. Degrees of greying can be determined, for example, by standard chromaticity methods, for example, the CIELAB color space scale established by the International Commission on Illumination. The CIELAB scale has three parameters, L*, a*, and b*. "L*" is a brightness value, "a*" is a measure of the redness (+a) and greenness (−a), and the "b*" value is a measure of yellowness (+b) and blueness (−b). For both the "a*" and "b*" values, the greater the departure from 0, the more intense the color. Measurement of coated substrates to obtain CIELAB b* values is done with a Colorimeter obtained from Hunter Lab (Reston, Va.), under the trade designation "COLORFLEX", using the method described in the Examples, below. As shown in Table 7, the examples of the present disclosure had higher b* value after 90 days of weathering outdoors than the comparative examples. Also, as shown in Table 7, the time for the coated articles to appear grey was longer from the examples of the present disclosure than the comparative examples. Unexpectedly, the presence of the water-repellant polymer provided a higher b* value and a longer time to reach the grey appearance than compositions that included the stabilizer to ultraviolet light without the water-repellant polymer. See, for example, Comparative Example 8 versus Example 5 in Table 7.

The present disclosure provides a coated article comprising at least one of hardwood, softwood, oriented strand board, or plywood having a coating on at least a portion of its surface, wherein the surface that is at least partially coated has a b* value on the International Commission on Illumination L*, a*, and b* scale greater than 15 after 90 days of weathering outdoors at an average maximum daily temperature in a range from 20° C. to 25° C. while the surface that is at least partially coated was exposed to a total precipitation in a range from 250 millimeters to 265 millimeters, average daylight in a range from 12 to 14 hours, and an average UV index in a range from 4.0 to 4.5. Useful coatings include any of those described above in any of their embodiments. The humidity at the time of weathering under these conditions may, in some cases, be in the range from 70% to 85%, 75% to 85%, or about 80%. The average daily temperature, precipitation, average daylight hours, average UV index, and humidity are tracked by several organizations and can be found on various websites such as https://climate.weather.gc.ca, https://www.worldweatheronline.com, and http://www.timebie.com/sun.

We have found that whether a surface of an article that is at least partially coated has a b* value on the International Commission on Illumination L*, a*, and b* scale greater than 15 after 90 days of weathering outdoors at an average maximum daily temperature in a range from 20° C. to 25° C. while the surface that is at least partially coated was exposed to a total precipitation in a range from 250 millimeters to 265 millimeters, average daylight in a range from 12 to 14 hours, and an average UV index in a range from 4.0 to 4.5 can also be determined using accelerated weathering in an Atlas Ci5000 Xenon Weather-Ometer from Atlas Material Testing Technology when weathering is performed according to ASTM G155-13, Standard Practice for Operating Xenon Arc Light Apparatus for Exposure of Non-Metallic Materials, with the customized settings outlined in Cycle 1 of Table X3.1 in Appendix X1 of ASTM G155-13 and having the following settings:

Irradiance: 0.68 $W/m^2$ or higher at 340 nm

Black Panel Temperature: 70° C. (light phase), 70° C. (light and water spray phase)

Chamber Temperature: 47° C. (light phase), 47° C. (light and water spray phase)

Relative Humidity: 70% (light phase), 95% (light and water spray phase) as described in the Examples below. We have found that 69 to 86 $MJ/m^2$ of total irradiance from 295 nm to 385 nm using this test method provides the equivalent of 90 days of natural aging under the conditions described above. Therefore, we have determined that the surface of an at least partially coated article that has a b* value on the International Commission on Illumination L*, a*, and b* scale greater than 15 after the accelerated weathering described above has a b* value greater than 15 after 90 days of weathering outdoors at an average maximum daily temperature in a range from 20° C. to 25° C. while the surface that is at least partially coated was exposed to a total precipitation in a range from 250 millimeters to 265 millimeters, average daylight in a range from 12 to 14 hours, and an average UV index in a range from 4.0 to 4.5.

Certain polymeric coating compositions can whiten or develop a milky appearance when exposed to water. Typically, such whitening is reversible and disappears upon drying. In compositions of the present disclosure, such whitening does not hinder the ability of the composition to prevent or delay the greying of the cellulosic article coated with the composition when exposed to weathering, but a milky appearance in the coating itself may be less desirable in some circumstances. In some embodiments, compositions of the present disclosure can resist such whitening when exposed to water. In these embodiments, the composition may remain clear after being soaked in water for seven days, as determined by visual inspection. The water-repellant polymer in the composition of the present disclosure effectively reduces the tendency of the composition of the present disclosure to whiten. See, for example, a comparison of Example 11 vs. Comparative Example 16, a comparison of Comparative Example 13 vs. Comparative Example 10, and a comparison of Comparative Example 17 vs. Comparative Example 14, all of which show that compositions including the water-repellant polymer are less likely to develop a milky appearance than compositions that are the same or very similar except that they do not include the water-repellant polymer. The acrylic resin selected for the composition of the present disclosure can impact the tendency of the composition to whiten. See, for example, Examples 12 vs. 8, below. Also, as shown in the Examples, below, the presence of an alkyd polymer can reduce the level of whitening in the composition; see, for example, Comparative Examples 14 to 17 vs. Comparative Examples 10 to 13, respectively. Furthermore, curing the composition at an elevated temperature can reduce the tendency of the composition to whiten. As reported in the Examples, below when cured for 15 minutes at 95° C., the vast majority of Examples and Comparative Examples remained clear for seven days of water immersion.

The article and the coated article of the present disclosure in any of their embodiments can have a coating thickness of up to 250 micrometers, up to 125 micrometers, up to 100 micrometers, up to 50 micrometers, or up to 25 micrometers.

The presence of a photoluminescent compound in the coating can be used to confirm that the coating is applied to the entire surface. This confirmation may be made in-line during the application process or added as a quality confirmation after coating and drying of the coating. The confirmation can be carried out by exposing the coated article to at least one of ultraviolet or blue light to inspect the coating on at least a portion of the surface. Furthermore, the photoluminescent compound can be useful, for example, for providing information related to the wear of the coating after exposure to environmental conditions, either after weathering for 90 days under the conditions described above, or after being exposed to a work site, where it may undergo some period of weathering and some level of abrasion, for example, by handling or by being exposed to work boots or other tools.

Some Embodiments of the Disclosure

In a first embodiment, the present disclosure provides a composition comprising:

- an acrylic polymer;
- a water-repellent polymer, and
- a stabilizer against ultraviolet light, wherein the stabilizer is an ultraviolet light-absorber, a hindered amine light stabilizer, or a combination thereof.

In a second embodiment, the present disclosure provides the composition of the first embodiment, wherein the acrylic polymer is at least one of crosslinked or crosslinking.

In a third embodiment, the present disclosure provides the composition of the second embodiment, wherein the crosslinking acrylic polymer comprises at least one of silane groups, N-methylol groups, acetoacetoxy groups, carboxylic acid groups, ketones or aldehydes and/or the crosslinked acrylic polymer comprises at least one of siloxane bonds, metal-chelated acetoacetoxy or carboxylic acid groups, alpha-amino amide groups, or ketimine or aldimine groups.

In a fourth embodiment, the present disclosure provides the composition of the second or third embodiment, wherein the acrylic polymer that is at least one of crosslinking or crosslinked makes up at least 60%, 70%, 75%, 80%, 90%, or 95% of total acrylic polymer in the composition.

In a fifth embodiment, the present disclosure provides the composition of any one of the first to fourth embodiments, wherein the composition is and/or is derived from a waterborne composition comprising a crosslinking acrylic polymer dispersion, the water-repellant polymer, and the stabilizer, wherein the crosslinking acrylic polymer dispersion optionally includes a crosslinker.

In a sixth embodiment, the present disclosure provides the composition of any one of the first to fifth embodiments, further comprising an alkyd polymer.

In a seventh embodiment, the present disclosure provides the composition of the sixth embodiment, wherein the acrylic polymer is present in an amount of at least 50 percent by weight, and the alkyd polymer is present in an amount of at least 5 percent by weight, based the total weight of the acrylic polymer and the alkyd polymer.

In an eighth embodiment, the present disclosure provides the composition of the seventh embodiment, wherein the alkyd polymer is present in an amount of up to 20 percent by weight, based the total weight of the acrylic polymer and the alkyd polymer.

In a ninth embodiment, the present disclosure provides the composition of any one of the first to eighth embodiments, further comprising a biocide.

In a tenth embodiment, the present disclosure provides the composition of any one of the first to ninth embodiments, further comprising a polyurethane.

In an eleventh embodiment, the present disclosure provides the composition of the tenth embodiment, wherein the polyurethane polymer is present in an amount of at least 5 percent by weight, based on the total weight of the acrylic polymer, the polyurethane, and optionally the alkyd polymer.

In a twelfth embodiment, the present disclosure provides the composition of any one of the first to eleventh embodiments, wherein the water-repellant polymer comprises a silicone polymer.

In a thirteenth embodiment, the present disclosure provides the composition of any one of the first to twelfth embodiments, wherein the water-repellant polymer comprises a wax.

In a fourteenth embodiment, the present disclosure provides the composition of any one of the first to thirteenth embodiments, wherein the ultraviolet light-absorber comprises at least one of a benzophenone, a benzotriazole, a triazine, a cinnamate, a cyanoacrylate, a dicyano ethylene, a salicylate, an oxanilide, or a para-aminobenzoates, or wherein the ultraviolet light-absorber comprises at least one of a benzophenone, a benzotriazole, or a triazine.

In a fifteenth embodiment, the present disclosure provides the composition of any one of the first to fourteenth embodiments, wherein the composition further comprises a photoluminescent compound.

In a sixteenth embodiment, the present disclosure provides the composition of any one of the first to fifteenth embodiments, wherein the stabilizer is a combination of the ultraviolet light-absorber and the hindered amine light stabilizer.

In a seventeenth embodiment, the present disclosure provides the composition of any one of the first to sixteenth embodiments, further comprising water.

In an eighteenth embodiment, the present disclosure provides a method of making the composition of any one of the first to seventeenth embodiments, the method comprising:

combining the acrylic polymer, the water-repellant polymer, and the stabilizer to make the composition.

In a nineteenth embodiment, the present disclosure provides the method of the eighteenth embodiment, further comprising combining the alkyd polymer with at least one of the acrylic polymer, the water-repellant polymer, and the stabilizer to make the composition.

In a twentieth embodiment, the present disclosure provides the method of the eighteenth or nineteenth embodiment, further comprising combining a polyurethane with at least one of the acrylic polymer, the water-repellant polymer, and the stabilizer to make the composition.

In a twenty-first embodiment, the present disclosure provides a method of making the composition of any one of the first to seventeenth embodiments, the method comprising:

combining dispersions of the acrylic polymer in water, the water-repellant polymer in water, and the stabilizer in water to make the composition, optionally wherein the dispersion of the acrylic polymer further comprises a crosslinker.

In a twenty-second embodiment, the present disclosure provides the method of the twenty-first embodiment, further comprising combining a dispersion of the alkyd polymer in water with at least one of the dispersions of the acrylic polymer in water, the water-repellant polymer in water, and the stabilizer in water to make the composition.

In a twenty-third embodiment, the present disclosure provides the method of the twenty-first or twenty-second embodiment, further comprising combining a dispersion of a polyurethane in water with at least one of the dispersions of the acrylic polymer in water, the water-repellant polymer in water, and the stabilizer in water to make the composition.

In a twenty-fourth embodiment, the present disclosure provides an article comprising a substrate having a surface at least partially coated with the composition of any one of the first to seventeenth embodiments.

In a twenty-fifth embodiment, the present disclosure provides the article of the twenty-fourth embodiment, wherein the substrate comprises at least one of treated or untreated hardwood, softwood, oriented strand board, particleboard, fiberboard, or plywood.

In a twenty-sixth embodiment, the present disclosure provides a method of making the article of the twenty-fourth or twenty-fifth embodiments, the method comprising applying the composition of any one of the first to seventeenth embodiments or made by the method of any one of the eighteenth to twenty-third embodiments to at least a portion of the substrate.

In a twenty-seventh embodiment, the present disclosure provides the method of the twenty-sixth embodiment, further comprising heating the substrate before applying the composition to at least a portion of the substrate.

In a twenty-eighth embodiment, the present disclosure provides the method of the twenty-sixth or twenty-seventh embodiments, further comprising heating the substrate after applying the coating composition to at least a portion of the substrate.

In a twenty-ninth embodiment, the present disclosure provides the method of the twenty-seventh or twenty-eighth embodiment, wherein heating the substrate is carried out at a temperature of at least 75° C. for at least 15 minutes.

In a thirtieth embodiment, the present disclosure provides the method of any one of the twenty-sixth to twenty-ninth embodiments, further comprising removing the water from the coating composition.

In a thirty-first embodiment, the present disclosure provides a coated article comprising at least one of hardwood, softwood, oriented strand board, or plywood having a surface that is at least partially coated with a coating, wherein the surface that is at least partially coated has a b* value on the International Commission on Illumination L*, a*, and b* scale greater than 15 after 90 days of weathering outdoors at an average maximum daily temperature in a range from 20° C. to 25° C. while the surface that is at least partially coated was exposed to a total precipitation in a range from 250 millimeters to 265 millimeters, average daylight in a range from 12 to 14 hours, and an average UV index in a range from 4.0 to 4.5.

In a thirty-second embodiment, the present disclosure provides the coated article of the thirty-first embodiment, wherein the coating comprises:

an acrylic polymer;

a water-repellent polymer, and a stabilizer against ultraviolet light, wherein the stabilizer is an ultraviolet light-absorber, a hindered amine light stabilizer, or a combination thereof.

In a thirty-third embodiment, the present disclosure provides the coated article of the thirty-second embodiment, wherein the acrylic polymer is at least one of crosslinked or crosslinking.

In a thirty-fourth embodiment, the present disclosure provides the coated article of the thirty-third embodiment, wherein the crosslinking acrylic polymer comprises at least one of silane groups, N-methylol groups, acetoacetoxy groups, carboxylic acid groups, ketones or aldehydes and/or the crosslinked acrylic polymer comprises at least one of siloxane bonds, metal-chelated acetoacetoxy or carboxylic acid groups, alpha-amino amide groups, or ketimine or aldimine groups.

In a thirty-fifth embodiment, the present disclosure provides the coated article of the thirty-third or thirty-fourth embodiment, wherein the acrylic polymer that is at least one of crosslinking or crosslinked makes up at least 60%, 70%, 75%, 80%, 90%, or 95% of total acrylic polymer in the coating.

In a thirty-sixth embodiment, the present disclosure provides the coated article of any one of the thirty-second to thirty-fifth embodiments, wherein the coating is and/or is derived from a waterborne composition comprising a crosslinking acrylic polymer dispersion, the water-repellant polymer, and the stabilizer, wherein the crosslinking acrylic polymer dispersion optionally includes a crosslinker.

In a thirty-seventh embodiment, the present disclosure provides the coated article of any one of the thirty-first to thirty-sixth embodiments, wherein the coating further comprises an alkyd polymer.

In a thirty-eighth embodiment, the present disclosure provides the coated article of the thirty-seventh embodiment, wherein the acrylic polymer is present in an amount of at least 50 percent by weight, and the alkyd polymer is present in an amount of at least 5 percent by weight, based the total weight of the acrylic polymer and the alkyd polymer.

In a thirty-ninth embodiment, the present disclosure provides the coated article of the thirty-seventh or thirty-eighth embodiment, wherein the alkyd polymer is present in an amount of up to 20 percent by weight, based the total weight of the acrylic polymer and the alkyd polymer.

In a fortieth embodiment, the present disclosure provides the coated article of any one of the thirty-first to thirty-ninth embodiments, wherein the coating further comprises a biocide.

In a forty-first embodiment, the present disclosure provides the coated article of any one of the thirty-first to fortieth embodiments, wherein the coating further comprises a polyurethane.

In a forty-second embodiment, the present disclosure provides the coated article of the forty-first embodiment, wherein the polyurethane is present in an amount of at least 5 percent by weight, based on the total weight of the acrylic polymer, the polyurethane, and optionally the alkyd polymer.

In a forty-third embodiment, the present disclosure provides the coated article of any one of the thirty-second to forty-second embodiments, wherein the water-repellant polymer comprises a silicone polymer.

In a forty-fourth embodiment, the present disclosure provides the coated article of any one of the thirty-second to forty-third embodiments, wherein the water-repellant polymer comprises a wax.

In a forty-fifth embodiment, the present disclosure provides the coated article of any one of the thirty-second to forty-fourth embodiment, wherein the ultraviolet light-absorber comprises at least one of a benzophenone, a benzotriazole, a triazine, a cinnamate, a cyanoacrylate, a dicyano ethylene, a salicylate, an oxanilide, or a para-aminobenzoate.

In a forty-sixth embodiment, the present disclosure provides the coated article of the forty-fifth embodiment, wherein the ultraviolet light-absorber comprises at least one of a benzophenone, a benzotriazole, or a triazine.

In a forty-seventh embodiment, the present disclosure provides the coated article of any one of the thirty-second to forty-sixth embodiments, wherein the stabilizer is a combination of the ultraviolet light-absorber and the hindered amine light stabilizer.

In a forty-eighth embodiment, the present disclosure provides the coated article of any one of the thirty-first to forty-seventh embodiments, wherein the coating further comprises a photoluminescent compound.

In a forty-ninth embodiment, the present disclosure provides a method of making the coated article of any one of the thirty-second to forty-eighth embodiments, the method comprising:

applying a coating composition comprising the acrylic polymer, the water-repellant polymer, and the stabilizer to at least a portion of the substrate.

In a fiftieth embodiment, the present disclosure provides the method of the forty-ninth embodiment, further comprising combining the acrylic polymer, the water-repellant polymer, and the stabilizer to make a coating composition.

In a fifty-first embodiment, the present disclosure provides the method of the fiftieth embodiment, further comprising combining an alkyd polymer with at least one of the acrylic polymer, the alkyd polymer, the water-repellant polymer, and the stabilizer to make the coating composition.

In a fifty-second embodiment, the present disclosure provides the method of the fiftieth or fifty-first embodiment, further comprising combining a polyurethane with at least one of the acrylic polymer, the water-repellant polymer, and the stabilizer to make the coating composition.

In a fifty-third embodiment, the present disclosure provides the method of the forty-ninth embodiment, further comprising combining dispersions of the acrylic polymer in water, the water-repellant polymer in water, and the stabilizer in water to make the coating composition, and wherein the dispersion of the acrylic polymer in water optionally further comprises a crosslinker.

In a fifty-fourth embodiment, the present disclosure provides the method of the fifty-third embodiment, further comprising combining a dispersion of an alkyd polymer in water with at least one of the dispersions of the acrylic polymer in water, the water-repellant polymer in water, and the stabilizer in water to make the coating composition.

In a fifty-fifth embodiment, the present disclosure provides the method of any one of the fifty-third or fifty-fourth embodiment, further comprising combining a dispersion of a polyurethane in water with at least one of the dispersions of the acrylic polymer in water, the water-repellant polymer in water, and the stabilizer in water to make the coating composition.

In a fifty-sixth embodiment, the present disclosure provides the method of any one of the forty-ninth to fifty-fifth embodiments, further comprising heating the substrate before applying the coating composition to at least a portion of the substrate.

In a fifty-seventh embodiment, the present disclosure provides the method of any one of the forty-ninth to fifty-sixth embodiments, further comprising heating the substrate after applying the coating composition to at least a portion of the substrate.

In a fifty-eighth embodiment, the present disclosure provides the method of the fifty-sixth or fifty-seventh embodiment, wherein heating the substrate is carried out at a temperature of at least 75° C. for at least 15 minutes.

In a fifty-ninth embodiment, the present disclosure provides the method of any one of the forty-ninth to fifty-eighth embodiments, further comprising removing the water from the coating composition.

In a sixtieth embodiment, the present disclosure provides the method of any one of the twenty-sixth to thirtieth or forty-ninth to fifty-ninth embodiments, wherein the composition comprises a photoluminescent compound, the method further comprising exposing the article to at least one of ultraviolet or blue light to inspect the surface of the substrate.

In a sixty-first embodiment, the present disclosure provides a method of inspecting the article of the twenty-fourth or twenty-fifth embodiment, wherein the composition comprises a photoluminescent compound, or of the forty-eighth embodiment, the method comprising exposing the article to at least one of ultraviolet or blue light to inspect the surface of the substrate.

In a sixty-second embodiment, the present disclosure provides the composition of any one of the first to sixteenth embodiments or the article of the twenty-fourth or twenty-fifth embodiment, wherein the composition remains clear after seven days of immersion in water at ambient temperature as determined by visual inspection at a normal angle.

In a sixty-third embodiment, the present disclosure provides the coated article of any one of the thirty-first to forty-eighth embodiments, wherein the coating remains clear after seven days of immersion in water at ambient temperature as determined by visual inspection at a normal angle.

Embodiments of the compositions, articles, and methods disclosed herein are further illustrated by the following examples, but the particular materials and amounts thereof recited in these examples, as well as other conditions and details, should not be construed to unduly limit this invention.

EXAMPLES

Unless otherwise noted, all parts, percentages, ratios, etc. in the Examples and the rest of the specification are by weight, and all reagents used in the examples were obtained, or are available, from general chemical suppliers such as, for example, Sigma-Aldrich, St. Louis, Mo., or may be synthesized by conventional methods. Panels of OSB, poplar plywood, cedar fence board (CFB), cedar deck board (CDB), and maple having dimensions of 2.5 in. by 5.75 in. (6.4 cm by 14.6) were obtained from Home Depot of Canada. The following abbreviations are used in this section: ft=feet, cm=centimeters, in=inches, μL=microliters, °=degree angle, g=grams, lbs=pounds, ° C.=degrees Celsius, ° F.=degrees Fahrenheit, mm=millimeter, mL=milliliter, oz=ounce, min=minutes, MJ=megajoule, and $m^2$=square meter. Unless otherwise noted, all parts, percentages, ratios, etc. in the Examples and the rest of the specification are by weight.

TABLE 1

| Materials Used in the Examples | |
|---|---|
| Abbreviation | Description and Source |
| AC 2403 | Acrylic emulsion, obtained under the trade designation "ALBERDINGK AC 2403" from Alberdingk Boley, Inc., Greensboro, N.C. |
| GL 618 | Acrylic emulsion, obtained under the trade designation "RHOPLEX GL 618" from Dow Chemical Company, Calgary, Alta. |
| Neocar 820 | Acrylic emulsion, obtained under the trade designation "NEOCAR ACRYLIC 820" from Arkema, King of Prussia, Pa. |
| U 4000 | Polyurethane dispersion, obtained under the trade designation "ALBERDINGK U 4000" from Alberdingk Boley, Inc. |
| AQ 101 | Alkyd emulsion, obtained under the trade designation "BECKOSOL AQ 101" from Reichhold, Azusa, Calif. |
| U 4101 | Polyurethane dispersion, obtained under the trade designation "ALBERDINGK U 4101" from Alberdingk Boley. |
| Silres 1360 | Polysiloxane emulsion, obtained under the trade designation "SILRES BS 1360" from Wacker, Adrian, Mich. |
| 5333-DW | Aqueous dispersion of a blend of UV absorbers (UVA) and a hindered amine light stabilizer, obtained under the trade designation "TINUVIN 5333-DW" from BASF, Florham Park, N.J. |
| S 5005 | Aqueous colloidal solution of amorphous Silicon dioxide, obtained under the trade designation "DISPERCOLL S 5005" from Covestro, Pittsburgh, Pa. |
| Silres 1340 | Polysiloxane emulsion, obtained under the trade designation "SILRES BS 1340" from Wacker. |
| Silres 1306 | Polysiloxane emulsion, obtained under the trade designation "SILRES BS 1306" from Wacker. |
| Silres WH | Polysiloxane emulsion, obtained under the trade designation "SILRES WH" from Wacker. |
| 8086 | Wax emulsion, obtained under the trade designation "AQUACER 8086", from Byk USA, Inc., Wallingford, Conn. |
| 398/1 | Wax emulsion, obtained under the trade designation "398/1", from Clariant Corporation, Charlotte, N.C. |
| 6062A | Wax emulsion, obtained under the trade designation "6062A", from The International Group, Toronto, Ont. |
| LD 671A | High modulus polychloroprene homopolymer, obtained under the trade designation "LD 671A" from Denka Performance Elastomer, New York, N.Y. |
| 123-DW | Aqueous dispersion of a hindered amine light stabilizer, obtained under the trade designation "TINUVIN 123-DW" from BASF. |
| IPW40 | Biocide, obtained under the trade designation "ANTICIDE IPW40" from Thor Specialties, Shelton, Conn. |
| OSB | Oriented Strand Board<br>Dimensions of board: 4 ft × 8 ft board cut down to various sizes for experimentation - 2 in × 2 in (5.1 cm × 5.1 cm), 4 in × 4 in (10.2 cm × 10.2 cm), 6 in × 12 in (15.2 cm × 30.5 cm), 12 in × 12 in (30.5 cm × 30.5 cm) |
| OSB-2 | Dimensions: 2.5 in. by 5.75 in. by 0.25 in. (6.4 cm by 14.6 cm by 0.64 cm) |
| Plywood | Poplar Plywood<br>Dimensions: 2.5 in. by 5.75 in. by 0.625 in. (6.4 cm by 14.6 cm by 1.6 cm) |
| CFB | Cedar Fence Board (CFB)<br>Dimensions: 2.5 in. by 5.75 in. by 0.625 in. (6.4 cm by 14.6 cm by 1.6 cm) |

TABLE 1-continued

| Materials Used in the Examples | |
|---|---|
| Abbreviation | Description and Source |
| CDB | Cedar Deck Board (CDB)<br>Dimensions: 2.5 in. by 5.75 in. by 1.0 in. (6.4 cm by 14.6 cm by 2.54 cm) |
| Maple | Dimensions: 2.5 in. by 5.75 in. by 0.75 in. (6.4 cm by 14.6 cm by 1.9 cm) |

Test Method 1: Contact Angle Measurement

The contact angle measurement was performed with a VCA Optima XE, obtained from AST Products, Inc (Billerica, Mass.). To measure the contact angle, 1.5 μL of de-ionized water was dispensed from the equipment syringe onto the surface. A photograph of the water droplet on the surface was taken immediately using the computer attached to the instrument. The angle between the surface and the bottom left corner of the water droplet was measured. One minute after the initial photograph was taken, another photograph of that same water droplet was taken, and the contact angle was measured. Both measurements were recorded and saved to the computer and are shown in Table 4.

Test Method 2: Adhesion Measurement

The adhesion measurement was performed according to the crosshatch test. A half inch "X" was cut into the coated surface with a razor blade and a strip of around ¾ in by 1¾ in (1.9 cm×4.4 cm) Scotch® tape was pressed over the "X", leaving about ¾ in to 1 in (1.9 cm×2.5 cm) of the tape. The tape was removed quickly by hand immediately, and the amount of coating removed on the tape was analyzed. The results range from no coating removed, very little coating removed (around 1-5 very small flecks of coating removed), little coating removed (around 6-10 very small flecks of coating removed), moderate amount removed (around half the tape is covered with coating flecks), and lots of coating removed (most of the tape is covered with coating flecks). Results were recorded and shown in Table 5.

Test Method 3: Water Run-Off Test

A fixture was constructed that was comprised of two plywood boards positioned against each other at a 90° angle and attached with screws. The vertical board had dimensions of 2 ft by 7½ in by ⅝ in (61 cm×19.1 cm×1.6 cm) and the horizontal board had dimensions of 1 ft by 7½ in by 5/sin (30.5 cm×19.1 cm×1.6 cm). The two pieces of wood holding the unit together had dimensions of 6 in by 3.5 in ×1.5 in (15.2 cm×8.9 cm×3.8 cm) and 1.5 in by 3.5 in by 1.5 in (3.8 cm×8.9 cm×3.8 cm). A 12 in by 12 in (30.5 cm×30.5 cm) aluminum panel weighing 188.67 g (0.42 lbs) was propped against a marking to create an angle of incline; i.e., when the aluminum panel is placed at a setting corresponding to 9 in, the angle is approximately 42°.

The test was conducted at this incline angle of 42°. An OSB panel was attached to the aluminum panel using double sided tape (3M 467 MP, obtained from 3M, St Paul, Minn.) and a drop of water was dispensed from a pipet (Fisherbrand™ Standard Disposable Transfer Pipettes, 5.875 inches, 13-711-7M, obtained from Molecular Bio Products Inc, Waltham, Mass.) onto the top of the OSB panel. The time in seconds for the drop of water to run off to the bottom of the OSB panel was measured and recorded with a stopwatch. Results are shown in Table 6.

Test Method 4: Weathering Test

Uncoated and coated OSB panels were subjected to exterior natural weathering conditions at a location of 43° N, 81° W over the time period of July 22 to Oct. 28, 2019. Over the course of the weathering test, there was an average maximum daily temperature of 22° C. (71.6° F.), an average minimum daily temperature of 11° C. (51.8° F.), an average mean daily temperature of 17° C. (62.6° F.), obtained from https://climate.weather.gc.ca; a total precipitation of 257 mm (10.12 in), average daylight 13 hours, obtained from https://www.worldweatheronline.com; and an average UV index of 4.2, obtained from http://www.timebie.com/sun. The average humidity over this time period was 80% as reported by https://www.worldweatheronline.com.

The samples were monitored by taking pictures and measuring the CIE L*a*b* color values using a Colorflex colorimeter, obtained from Hunter Lab (Reston, Va.). If the samples were wet, they were allowed to dry in the lab for a minimum of 24 hours before taking pictures and measurements.

The CIELAB color space (also known as CIE L*a*b* or sometimes abbreviated as simply “Lab” color space) is a color space defined by the International Commission on Illumination (CIE) in 1976. It expresses color as three values: L* for the lightness from black (0) to white (100), a* from green (−) to red (+), and b* from blue (−) to yellow (+). CIELAB was designed so that the same amount of numerical change in these values corresponds to roughly the same amount of visually perceived change.

On a 2 in ×2 in (5.1 cm×5.1 cm) OSB panel sample, two or three spots were measured along the OSB panel and each value was averaged. The values were then plotted in tables and graphs. Results are shown in Table 7.

Test Method 5: Accelerated Weathering

The test samples were exposed to accelerated weathering conditions in an Atlas Ci5000 Xenon Weather-Ometer from Atlas Material Testing Technology, 4114 North Ravenswood Avenue, Chicago, Ill., 60613. Testing was performed according to ASTM G155-13, Standard Practice for Operating Xenon Arc Light Apparatus for Exposure of Non-Metallic Materials, with the customized settings outlined in Cycle 1 of Table X3.1 in Appendix X1 of ASTM G155-13 with customized settings of:

- Irradiance: 0.68 W/m$^2$ or higher at 340 nm
- Black Panel Temperature: 70° C. (light phase), 70° C. (light and water spray phase)
- Chamber Temperature: 47° C. (light phase), 47° C. (light and water spray phase)
- Relative Humidity: 70% (light phase), 95% (light and water spray phase)

The total irradiance from 295-385 nm (MJ/m$^2$) the test samples were exposed to is reported. We have found that 69 to 86 MJ/m$^2$ of total irradiance from 295 nm to 385 nm (TUV) using this test method provides the equivalent of 3 months of natural aging using Test Method 4: Weathering Test.

Test Method 6: Milkiness Observation

Samples were placed coated side down into a water bath. Visual observations on the level of whitening or milkiness were made after 24 hours and repeated for 7 days. The results are reported in Table 10.

Preparation of Examples EX 1-EX 5 and Comparative Examples (CE) CE1-CE9

A 50 ml (1.7 oz) tri-pour cup (Fisherbrand™ Tri-Cornered Polypropylene Beakers, obtained from Fisher Scientific, Waltham Mass.) was placed on a scale and the scale was tared to zero. Each material was dispensed into the container with a pipet (Fisherbrand™ Standard Disposable Transfer Pipettes, 5.875 inches (14.9 cm), 13-711-7M, obtained from Molecular Bio Products Inc, Waltham, Mass.) until the predetermined weight was reached. The formulation was then mixed using a tongue depressor (obtained from Fisher Scientific, Waltham Mass.) for approximately 30 seconds. Typically, 4-10 g (0.14-0.35 oz) of formulation were prepared. Examples and Comparative Example formulations are shown in Table 2.

TABLE 2

Examples EX 1-EX 5 and Comparative Examples CE1-CE9

| Example | AC 2403 | S 5005 | LD 671A | AQ 101 | U 4101 | U 4000 | 123 DW | 5333-DW | Silres 1306 | Silres 1340 | Silres 1360 |
|---|---|---|---|---|---|---|---|---|---|---|---|
| EX 1 | 76 | 0 | 0 | 10 | 10 | 0 | 0 | 2 | 0 | 3 | 0 |
| EX 2 | 76 | 0 | 0 | 10 | 10 | 0 | 0 | 2 | 0 | 2 | 0 |
| EX 3 | 76 | 0 | 0 | 10 | 10 | 0 | 0 | 2 | 0 | 1.5 | 0 |
| EX 4 | 76 | 0 | 0 | 9 | 10 | 0 | 0 | 2 | 0 | 0 | 3 |
| EX 5 | 76 | 0 | 0 | 10 | 10 | 0 | 0 | 2 | 2 | 0 | 0 |
| CE1 | 81 | 6 | 0 | 6 | 7 | 0 | 0 | 0 | 0 | 0 | 0 |
| CE2 | 80 | 4 | 4 | 6 | 6 | 0 | 0 | 0 | 0 | 0 | 0 |
| CE3 | 77 | 0 | 0 | 10 | 13 | 0 | 0 | 0 | 0 | 0 | 0 |
| CE4 | 83 | 5 | 0 | 6 | 0 | 6 | 0 | 0 | 0 | 0 | 0 |
| CE5 | 83 | 3 | 3 | 6 | 0 | 5 | 0 | 0 | 0 | 0 | 0 |
| CE6 | 79 | 0 | 0 | 11 | 0 | 10 | 0 | 0 | 0 | 0 | 0 |
| CE7 | 79 | 0 | 0 | 10 | 10 | 0 | 2 | 0 | 0 | 0 | 0 |
| CE8 | 78 | 0 | 0 | 10 | 10 | 0 | 0 | 2 | 0 | 0 | 0 |
| CE9 | 100 | 0 | 0 | 0 | 0 | 0 | 0 | 0 | 0 | 0 | 0 |

Preparation of Examples EX 1-EX 5 and Comparative Examples CE1-CE9 Coated on OSB Panels The OSB panels (12 in by 12 in or 30.5×30.5 cm) were cut into samples measuring 2 in by 2 in (5.1 cm×5.1 cm). The weight of each panel to be used was recorded. One replicate set of panels for each example were placed in an oven at 94° C. for at least one hour prior to coating. When coating OSB panels, an ambient OSB panel was placed on a scale and approximately 0.25-0.30 g (0.009-0.011 oz) of Example or Comparative Example coating was dispensed from a pipet (Fisherbrand™ Standard Disposable Transfer Pipettes, 5.875 inches (14.9 cm), 13-711-7M, obtained from Molecular Bio Products Inc, Waltham, Mass.) onto one side of the OSB panel. The Example or Comparative Example coating was then evenly spread across the surface with a fresh 1-inch wide bristle paintbrush (D.I.Y. Pure Bristle Paint Brushes, obtained from Home Hardware, Canada). The weight of the panel and the wet coating were recorded. The finished wet coating weight was approximately 0.20 g. The procedure was then repeated on a heated OSB panel. Once the coating was dried, the weight of the panel and the dry coating were recorded (shown in Table 3). The coated OSB panels were dried for 24 hours in a fume hood prior to evaluation.

TABLE 3

Coating Amounts for Examples EX 1-EX 5 and Comparative Examples CE1-CE9 on OSB Panels

| OSB Panel Example | Coating Example | Weight of OSB (g) | Weight of OSB and Dry Coating (g) | Weight of Dry Coating (g) |
|---|---|---|---|---|
| EX 1 - OSB | EX A1 | 29.17 | 29.3 | 0.13 |
| EX 2 - OSB | EX A2 | 29.77 | 29.9 | 0.13 |
| EX 3 - OSB | EX A3 | 28.62 | 28.79 | 0.17 |
| EX 4 - OSB | EX A4 | 30.71 | 30.84 | 0.13 |
| EX 5 - OSB | EX A5 | 28.07 | 28.21 | 0.14 |
| CE1 - OSB | CE1 | 33.01 | 33.21 | 0.2 |
| CE2 - OSB | CE2 | 32.06 | 32.22 | 0.16 |
| CE3 - OSB | CE3 | 29.40 | 29.61 | 0.21 |
| CE4 - OSB | CE4 | 30.00 | 30.21 | 0.21 |
| CE5 - OSB | CE5 | 32.28 | 32.4 | 0.12 |
| CE6 - OSB | CE6 | 33.29 | 33.48 | 0.19 |
| CE7 - OSB | CE7 | 30.53 | 30.66 | 0.13 |
| CE8 - OSB | CE8 | 29.94 | 30.08 | 0.14 |
| CE9 - OSB | CE9 | 29.03 | 29.13 | 0.1 |

TABLE 4

Contact Angle Measurements for Examples EX 1-EX 5 and Comparative Examples CE1-CE9 on OSB Panels

| | Ambient Wood | | Heated Wood | |
|---|---|---|---|---|
| OSB Panel Example | Contact Angle (°) | Contact Angle After 1 Min (°) | Contact Angle (°) | Contact Angle After 1 Min (°) |
| EX 1 - OSB | 114 | 113 | 108 | 108 |
| EX 2 - OSB | 116 | 114 | 97 | 93 |
| EX 3 - OSB | 118 | 115 | 100 | 97 |
| EX 4 - OSB | 111 | 109 | 101 | 99 |
| EX 5 - OSB | 104 | 103 | 109 | 107 |
| CE1 - OSB | 92 | 89 | 82 | 79 |
| CE2 - OSB | 90 | 88 | 84 | 82 |
| CE3 - OSB | 92 | 90 | 92 | 89 |
| CE4 - OSB | 91 | 89 | 88 | 87 |
| CE5 - OSB | 92 | 85 | 83 | 81 |
| CE6 - OSB | 83 | 82 | 83 | 81 |
| CE7 - OSB | 84 | 84 | 93 | 90 |
| CE8 - OSB | 85 | 80 | 82 | 78 |
| CE9 - OSB | 117 | 113 | 81 | 77 |

A high contact angle was an indication of the resistance to water soaking into the OSB. A contact angle with little to no change after one minute indicated the stability of the coating with respect to water resistance.

TABLE 5

Adhesion Measurements for Examples EX 1-EX 5 and Comparative Examples CE1-CE9 on OSB Panels

| Example | Adhesion (ambient wood) | Adhesion (heated wood) |
|---|---|---|
| EX 1 - OSB | No coating removed | No coating removed |
| EX 2 - OSB | No coating removed | Very little coating removed |
| EX 3 - OSB | No coating removed | No coating removed |
| EX 4 - OSB | No coating removed | No coating removed |
| EX 5 - OSB | No coating removed | No coating removed |
| CE1 - OSB | Moderate amount of coating removed | Very little coating removed |
| CE2 - OSB | Moderate amount of coating removed | Very little coating removed |
| CE3 - OSB | Little coating removed | Very little coating removed |
| CE4 - OSB | Moderate amount of coating removed | Very little coating removed |
| CE5 - OSB | Moderate amount of coating removed | Very little coating removed |
| CE6 - OSB | Little coating removed | Very little coating removed |
| CE7 - OSB | Moderate amount of coating removed | Little coating removed |
| CE8 - OSB | Lots of coating removed | Very little coating removed |
| CE9 - OSB | Lots of coating removed | Little coating removed |

Coatings that have little to no coating removed have excellent adhesion to the substrate.

TABLE 6

Water Run-Off Test Results Examples EX 1, EX 4, and EX 5 on OSB Panels

| | | Ambient Wood | | Heated Wood | |
|---|---|---|---|---|---|
| Example | Angle of Incline (°) | Water Run-off (s) | Standard Deviation (s) | Water Run-off (s) | Standard Deviation (s) |
| EX 1 - OSB | 42 | 0.81 | 0.19 | 2.36 | 1.07 |
| EX 4 - OSB | 42 | 1.42 | 0.86 | 1.44 | 0.24 |
| EX 5 - OSB | 42 | 0.47 | 0.14 | 0.78 | 0.47 |

A shorter run-off time indicated the efficiency of the coating to shed water from an OSB panel.

TABLE 7

Weathering Results for Examples EX A1-EX A5 and Comparative Examples CE1-CE8 on OSB Panels

| Example | b* INITIAL value before exposure ambient/heated wood | b* value at 90 days Wood type A ambient wood | b* value at 90 days Wood type A heated wood | Weeks to grey appearance ambient wood | Weeks to grey appearance heated wood |
|---|---|---|---|---|---|
| OSB - No Coating | 21/— | 10 | — | 7 | |
| EX 1 - OSB | 24/24 | 26 | 25 | >26 | >30 |
| EX 2 - OSB | 22/22 | 15 | 19 | 13 | >30 |
| EX 3 - OSB | 22/22 | 23 | 23 | >30 | >30 |
| EX 4 - OSB | 28/25 | 27 | 25 | >26 | >26 |

TABLE 7-continued

| Weathering Results for Examples EX A1-EX A5 and Comparative Examples CE1-CE8 on OSB Panels | | | | | |
|---|---|---|---|---|---|
| Example | b* INITIAL value before exposure ambient/heated wood | b* value at 90 days Wood type A ambient wood | b* value at 90 days Wood type A heated wood | Weeks to grey appearance ambient wood | Weeks to grey appearance heated wood |
| EX 5 - OSB | 25/25 | 25 | 23 | >26 | >26 |
| CE1 - OSB | 22/22 | 3 | 10 | 2.5 | 11 |
| CE2 - OSB | 22/22 | 6 | 9 | 4 | 9 |
| CE3 - OSB | 22/22 | 8 | 13 | 6 | 11 |
| CE4 - OSB | 22/22 | 5 | 12 | 3.5 | 13 |
| CE5 - OSB | 22/22 | 5 | 23 | 4 | 14-21 |
| CE6 - OSB | 22/22 | 6 | 8 | 5 | 11 |
| CE7 - OSB | 22/22 | 7 | 11 | 6 | 11 |
| CE8 - OSB | 22/22 | 14 | 10 | 10 | 7 |

The b* value of 15 was an indication of when the surface of the OSB panel started to look grey.

Preparation of Examples EX 6 to EX 17 and Comparative Examples (CE) CE10 to CE17

The Preparation of Examples EX 6 to EX 17 and Comparative Examples CE10 to CE17 was carried out generally as described for Examples EX 1-EX 5 and Comparative Examples CE1-CE9 with the following modifications. A 50-mL (1.7 oz) SpeedMixer cup (obtained from Flacktek, Landrum, S.C.) was used instead of the 50-mL (1.7 oz) tri-pour cup. Instead of mixing with the tongue depressor, the formulation was mixed in a Flacktek SpeedMixer Model DAC 150 FV (obtained from Flacktek, Landrum, S.C.) for approximately 1 minute at 3540 rpm. The formulations for EX 6 to EX 17 and Comparative Examples CE10 to CE17 are provided in Table 8, below.

TABLE 8

| Ex. | AC 2403 | GL 618 | NEO 820 | AQ 101 | U 4101 | 5333-DW | 8086 | 398/1 | 6062 | Silres WH | Silres 1360 | IPW 40 |
|---|---|---|---|---|---|---|---|---|---|---|---|---|
| EX 6 | 84.5 | 0 | 0 | 10 | 0 | 2 | 3 | 0 | 0 | 0 | 0 | 0.5 |
| EX 7 | 85 | 0 | 0 | 10 | 0 | 2 | 0 | 1.5 | 0 | 1.5 | 0 | 0 |
| EX 8 | 94.5 | 0 | 0 | 0 | 0 | 2 | 3 | 0 | 0 | 0 | 0 | 0.5 |
| EX 9 | 95 | 0 | 0 | 0 | 0 | 2 | 0 | 0 | 3 | 0 | 0 | 0 |
| EX10 | 75 | 0 | 0 | 10 | 10 | 2 | 0 | 0 | 0 | 0 | 3 | 0 |
| EX11 | 0 | 79.5 | 0 | 15 | 0 | 2 | 3 | 0 | 0 | 0 | 0 | 0.5 |
| EX12 | 0 | 94.5 | 0 | 0 | 0 | 2 | 3 | 0 | 0 | 0 | 0 | 0.5 |
| EX13 | 0 | 95 | 0 | 0 | 0 | 2 | 0 | 0 | 3 | 0 | 0 | 0 |
| EX14 | 0 | 0 | 94.5 | 0 | 0 | 2 | 3 | 0 | 0 | 0 | 0 | 0.5 |
| EX15 | 0 | 0 | 95 | 0 | 0 | 2 | 0 | 1.5 | 0 | 1.5 | 0 | 0 |
| EX16 | 0 | 95 | 0 | 0 | 0 | 2 | 0 | 0 | 0 | 0 | 3 | 0 |
| EX17 | 0 | 92 | 0 | 0 | 0 | 2 | 3 | 0 | 0 | 0 | 3 | 0 |
| CE10 | 0 | 100 | 0 | 0 | 0 | 0 | 0 | 0 | 0 | 0 | 0 | 0 |
| CE11 | 0 | 99.5 | 0 | 0 | 0 | 0 | 0 | 0 | 0 | 0 | 0 | 0.5 |
| CE12 | 0 | 98 | 0 | 0 | 0 | 2 | 0 | 0 | 0 | 0 | 0 | 0 |
| CE13 | 0 | 97 | 0 | 0 | 0 | 0 | 3 | 0 | 0 | 0 | 0 | 0 |
| CE14 | 0 | 82.5 | 0 | 17.5 | 0 | 0 | 0 | 0 | 0 | 0 | 0 | 0 |
| CE15 | 0 | 82 | 0 | 17.5 | 0 | 0 | 0 | 0 | 0 | 0 | 0 | 0.5 |
| CE16 | 0 | 81.5 | 0 | 16.5 | 0 | 2 | 0 | 0 | 0 | 0 | 0 | 0 |
| CE17 | 0 | 81 | 0 | 16 | 0 | 0 | 3 | 0 | 0 | 0 | 0 | 0 |

Preparation of Examples EX 6 to EX 17 and Comparative Examples CE10 to CE17 Coated on OSB Panels The coating of Examples 6, 8, 11, 12, 14, 16, and 17 and Comparative Examples CE 10 to CE 17 on 2 in by 2 in (5.1 cm×5.1 cm) OSB panels was carried out generally as described for Examples EX 1-EX 5 and Comparative Examples CE1-CE9 with the following modifications. The weight of each panel as well as the L*a*b* color, measured using a Hunter Colorimeter, were measured before coating. All samples were coated at ambient conditions. Approximately 0.14-0.17 g (0.005-0.006 oz) of the Example or Comparative Example composition was used per panel. The finished wet coating weight was approximately 0.11 g. For Examples 6, 8, 11, 12, 14, 16, and 17, two sets of 2 in by 2 in (5.1 cm×5.1 cm) panels were coated. One set was allowed to dry at ambient conditions for 24 hours. One set was placed in a 95° C. oven for 15 minutes, removed, then left to dwell at ambient conditions for 24 hours.

Examples 7, 9, 13, and 15 were coated the same way Examples 6, 8, 11, 12, 14, 16, and 17 and cured for one hour at 95° C. Example 10 was coated the same way as Examples 6, 8, 11, 12, 14, 16, and 17 and cured at ambient conditions.

Coating thicknesses were calculated from the wet coating weight and an experimentally determined coating weight-to-thickness ratio for a given surface area and are reported in Tables 9 and 10 below.

Examples 7, 9, 10, 13, and 15 were evaluated using Test Method 5: Accelerated Weathering. The initial b* value of the OSB panel, the b* value after 77 $MJ/m^2$ total irradiance from 295 nm to 385 nm (TUV) from accelerated weathering, and the TUV from accelerated weathering required for the panels to have a grey appearance are recorded in Table 9, below.

TABLE 9

| Example | coating thickness mils (μm) | b* initial value before exposure | b* value at 77 MJ/m$^2$ TUV | TUV to grey appearance (MJ/m$^2$) |
|---|---|---|---|---|
| control-no coating | 0 | 26 | 8 | 36 |
| EX 7 - OSB | 0.9 (23) | 29 | 15 | 77 |
| EX 9 - OSB | 0.9 (23) | 27 | 16 | 83 |
| EX 10 - OSB | 1.8 (46) | 26 | 20 | 108 |
| EX 13 - OSB | 0.9 (23) | 31 | 28 | >108* |
| EX 15 - OSB | 1 (25) | 29 | 17 | 89 |

*Accelerated weathering was stopped after 108 MJ/m$^2$, and the panel did not have a grey appearance.

Examples 6, 8, 11, 12, 14, 16, and 17 and Comparative Examples CE 10 to CE 17, cured at ambient conditions, were evaluated using Test Method 6: Milkiness Observation. The level of milkiness after one, two, and seven days of water immersion are recorded in Table 10, below.

TABLE 10

| Example | coating thickness mils (μm) | Observation Water Immersion -Days 1 | 2 | 7 |
|---|---|---|---|---|
| EX 6 - OSB | ~1 (25) | slightly milky | slightly milky | Milky |
| EX 8 - OSB | ~1 (25) | clear | slightly milky | milky |
| EX 11 - OSB | ~1 (25) | clear | slightly milky | slightly milky |
| EX 12 - OSB | ~1 (25) | clear | clear | clear |
| EX 14 - OSB | ~1 (25) | clear | clear | clear |
| EX 16 - OSB | 1.1 (28) | slightly milky | slight-moderate | moderately milky |
| EX 17 - OSB | 1.1 (28) | clear | clear | clear |
| CE-10 - OSB | 1.1 (28) | milky | milky | milky |
| CE-11 - OSB | 1 (25) | moderately milky | slightly milky | milky |
| CE-12 - OSB | 1.1 (28) | milky | milky | milky |
| CE-13 - OSB | 0.9 (23) | clear | v. slightly milky | v. slightly milky |
| CE-14 - OSB | 1 (25) | slightly milky | v. slightly milky | slightly milky |
| CE-15 - OSB | 0.9 (23) | clear | v. slightly milky | slightly milky |
| CE-16 - OSB | ~1 (25) | slightly milky | slightly milky | Slight-moderate |
| CE-17 - OSB | 0.9 (23) | clear | clear | clear |

When cured for 15 minutes at 95° C., Examples 11, 12, 14, 16, 17, and Comparative Examples CE-10 to CE-14, CE-16, and CE-17 remained clear for seven days of water immersion. Example 6 was observed to be moderately milky after three days and milky after seven days. Example 8 was observed to be sightly milky after five days. CE-15 was observed to be very slightly milky after two days and clear after seven days.

Preparation of Examples EX1, EX 4, and EX 6 on Wood Panels

New preparations of the Example 1, 4, and 6 compositions were prepared using the method described for EX 6 to EX 17 and Comparative Examples (CE) CE10 to CE17.

The coating of the Examples 1, 4, and 6 compositions on the 2.5 in. by 5.75 in. (6.4 cm by 14.6) wood panels of OSB (OSB-2), poplar plywood (plywood), cedar fence board (CFB), cedar deck board (CDB), and maple was carried out generally as described for Examples EX 1-EX 5 and Comparative Examples CE1-CE9 with the following modifications. The weight of each panel as well as the L*a*b* color, measured using a Hunter Colorimeter, were measured before coating. All samples were coated at ambient conditions. Approximately 0.52-0.63 g (0.018-0.022 oz) of the Example composition was used per panel. The finished wet coating weight was approximately 0.41 g. The panels were heated in an oven at 95° C. for 15 minutes and then allowed to dry at ambient conditions for 24 hours. Coating thicknesses were calculated from the wet coating weight and an experimentally determined coating weight-to-thickness ratio for a given surface area and are reported in Table 11, below. The panels were evaluated using Test Method 5: Accelerated Weathering. The initial b* value of the panel and the b* value after 59 MJ/m$^2$ total irradiance from 295 nm to 385 nm (TUV) from accelerated weathering are recorded in Table 11, below.

TABLE 11

| Example | Wood | coating thickness mils (μm) | b* initial value before exposure | b* value at 59 MJ/m$^2$ TUV |
|---|---|---|---|---|
| Control - no coating | OSB-2 | 0 | 21 | 10 |
| EX 1 - OSB-2 | OSB-2 | 0.9 (23) | 22 | 16 |
| EX 4 - OSB2 | OSB-2 | 0.83 (21) | 24 | 18 |
| EX 6 - OSB2 | OSB-2 | 1.1 (28) | 24 | 21 |
| Control - no coating | CFB | 0 | 21 | 11 |
| EX 1 - CFB | CFB | 0.9 (23) | 23 | 19 |
| EX 4 - CFB | CFB | 0.83 (21) | 24 | 24 |
| EX 6 - CFB | CFB | 1.1 (28) | 29 | 21 |
| Control - no coating | CDB | 0 | 24 | 9 |
| EX 1 - CDB | CDB | 0.9 (23) | 25 | 18 |
| EX 4 - CDB | CDB | 0.83 (21) | 25 | 20 |
| EX 6 - CDB | CDB | 1.1 (28) | 28 | 16 |
| Control - no coating | maple | 0 | 17 | 11 |
| EX 1 - maple | maple | 0.9 (23) | 19 | 25 |
| EX 4 - maple | maple | 0.83 (21) | 19 | 20 |
| EX 6 - maple | maple | 1.1 (28) | 19 | 19 |
| Control - no coating | plywood | 0 | 25 | 10 |
| EX 1 - plywood | plywood | 0.9 (23) | 25 | 19 |
| EX 4 - plywood | plywood | 0.83 (21) | 26 | 21 |
| EX 6 - plywood | plywood | 1.1 (28) | 29 | 15 |

Various modifications and alterations of this disclosure may be made by those skilled in the art without departing from the scope and spirit of the disclosure, and it should be understood that this invention is not to be unduly limited to the illustrative embodiments set forth herein.

What is claimed is:

1. A composition comprising:

an acrylic polymer that is at least one of crosslinked or capable of being crosslinked, wherein the acrylic polymer that is at least one of crosslinked or capable of being crosslinked makes up at least 75% of total acrylic polymer in the composition;

an alkyd polymer;

a water-repellent polymer, which is different from the acrylic polymer and the alkyd polymer; and a stabilizer against ultraviolet light, wherein the stabilizer is an ultraviolet light-absorber, a hindered amine light stabilizer, or a combination thereof.

2. The composition of claim 1, wherein the acrylic polymer is present in an amount of at least 50 percent by weight, and the alkyd polymer is present in an amount of at least 5 percent by weight, based on the total weight of the acrylic polymer and the alkyd polymer.

3. The composition of claim 1, further comprising a polyurethane, wherein the water-repellent polymer is selected from the group consisting of a silicone polymer, a wax, a polybutadiene polymer, polychloroprene, polyethylene, polypropylene, and polytetrafluoroethylene.

4. The composition of claim 1, wherein the water-repellent polymer is a silicone polymer or a wax.

5. The composition of claim 4, wherein the water-repellent polymer comprises the wax.

6. The composition of claim 1, further comprising a biocide.

7. The composition of claim 1, further comprising water.

8. A method of making the composition of claim 1, the method comprising:

combining a dispersion of the acrylic polymer in water, a dispersion of the alkyd polymer in water, a dispersion of the water-repellent polymer in water, and a dispersion of the stabilizer in water to make the composition.

9. The method of claim 8, further comprising:

applying the composition to at least a portion of a substrate.

10. The method of claim 9, further comprising heating the substrate at least one of before or after applying the coating composition to at least a portion of the substrate.

11. An article comprising a substrate having a surface at least partially coated with the composition of claim 1 to provide a coating on the surface.

12. The article of claim 11, wherein the substrate comprises at least one of treated or untreated hardwood, softwood, oriented strand board, particleboard, fiberboard, or plywood.

13. The article of claim 12, wherein the substrate comprises at least one of hardwood, softwood, oriented strand board, or plywood, and wherein the surface that is at least partially coated has a b* value on the International Commission on Illumination L*, a*, and b* scale greater than 15 after 90 days of weathering outdoors at an average maximum daily temperature in a range from 20° C. to 25° C. while the coating and the surface were exposed to a total precipitation in a range from 250 millimeters to 265 millimeters, average daylight in a range from 12 to 14 hours, and an average UV index in a range from 4.0 to 4.5.

14. The article of claim 13, wherein the coating comprises a photoluminescent compound.

15. The composition of claim 1, wherein the acrylic polymer that is capable of being crosslinked comprises at least one of silane groups, N-methylol groups, acetoacetoxy groups, carboxylic acid groups, ketone groups, or aldehyde groups and the acrylic polymer that is crosslinked comprises at least one of siloxane bonds, metal-chelated acetoacetoxy or carboxylic acid groups, alpha-amino amide groups, ketimine groups, or aldimine groups.

16. The composition of claim 1, wherein the acrylic polymer that is at least one of crosslinked or capable of being crosslinked makes up at least 80% of total acrylic polymer in the composition.

17. The composition of claim 1, wherein the composition is free of polyurethane or includes not more than 2% by weight of a polyurethane, based on the total weight of the composition.

18. The composition of claim 1, wherein the composition is a waterborne composition comprising an acrylic polymer dispersion, the alkyd polymer, the water-repellent polymer, and the stabilizer, wherein the acrylic polymer dispersion includes a crosslinker, and wherein the acrylic polymer is capable of being crosslinked.

19. The composition of claim 1, wherein the water-repellent polymer is selected from the group consisting of a silicone polymer, a wax, a polybutadiene polymer, polychloroprene, polyethylene, polypropylene, and polytetrafluoroethylene.

20. The composition of claim 1, wherein the alkyd polymer is present in an amount of up to 20 percent by weight, based on the total weight of the acrylic polymer and the alkyd polymer.

* * * * *